US012601648B2

(12) United States Patent
McAlpine et al.

(10) Patent No.: US 12,601,648 B2
(45) Date of Patent: Apr. 14, 2026

(54) BELT TENSION MEASUREMENT SYSTEM

(71) Applicant: Caterpillar Paving Products Inc.,
Brooklyn Park, MN (US)

(72) Inventors: Jacob J. McAlpine, Ostego, MN (US);
John Lee Marsolek, Watertown, MN
(US); Jeremy Wayne Lee, Ostego, MN
(US); Matthew Thomas Hanson, St.
Louis Park, MN (US)

(73) Assignee: Caterpillar Paving Products Inc.,
Brooklyn Park, MN (US)

( * ) Notice: Subject to any disclaimer, the term of this
patent is extended or adjusted under 35
U.S.C. 154(b) by 341 days.

(21) Appl. No.: 18/539,450

(22) Filed: Dec. 14, 2023

(65) Prior Publication Data

US 2025/0198096 A1      Jun. 19, 2025

(51) Int. Cl.
*G01L 5/10*          (2020.01)
*E01C 23/12*         (2006.01)
(52) U.S. Cl.
CPC .............. *G01L 5/10* (2013.01); *E01C 23/127*
(2013.01); *E01C 2301/00* (2013.01)
(58) Field of Classification Search
CPC ......... G01L 5/10; E01C 2/127; E01C 2301/00
USPC .......................................................... 177/16
See application file for complete search history.

(56) References Cited

U.S. PATENT DOCUMENTS

| | | | |
|---|---|---|---|
| 5,389,045 A | 2/1995 | Lyons | |
| 8,191,703 B2 * | 6/2012 | Tokhtuev | B65G 43/02 |
| | | | 198/810.04 |
| 10,024,708 B2 | 7/2018 | Marsolek et al. | |
| 10,227,739 B2 | 3/2019 | Laugwitz et al. | |
| 10,308,440 B2 * | 6/2019 | Marsolek | E01C 23/088 |
| 10,428,471 B1 * | 10/2019 | Hirman | E01C 19/1063 |
| 10,543,989 B2 * | 1/2020 | Francisco | B65G 23/44 |
| 10,611,577 B2 | 4/2020 | Engelmann et al. | |
| 10,949,786 B2 | 3/2021 | Marsolek et al. | |
| 11,511,943 B2 * | 11/2022 | Smith | G01L 5/10 |
| 2017/0102283 A1 | 4/2017 | Marsolek | |
| 2022/0010507 A1 | 1/2022 | Hirman | |
| 2025/0198820 A1 * | 6/2025 | Lee | G01F 1/86 |

* cited by examiner

*Primary Examiner* — Jacques M Saint Surin

(57) ABSTRACT

A cold planer includes a conveyor system having a conveyor
belt, a frame, and a roller rotatably coupled to the frame, a
motor coupled to the conveyor belt and configured to drive
the conveyor belt, a tension screw coupled between the
roller and the frame, a tension sensor configured to measure
the tension on the conveyor belt, and a controller commu-
nicably coupled with the tension sensor and the motor. The
controller is configured to receive the tension from the
tension sensor and calculate, based on the tension from the
tension sensor, a mass flow rate of material on the conveyor
belt.

20 Claims, 12 Drawing Sheets

BELT TENSION MEASUREMENT SYSTEM

TECHNICAL FIELD

This disclosure generally relates to measurement systems for conveyors. In particular, this disclosure relates to a measurement system configured to measure belt tension of a conveyor belt of a conveyor system used with heavy machinery, such as a cold planer machine or other roadwork machine.

BACKGROUND

Asphalt-paved roadways often facilitate substantial amounts of vehicular travel. When exposed to loading forces associated with vehicular travel as well as weather elements, such as temperature variation and moisture exposure, among other elements, roadways become worn or otherwise in a state of disrepair. Consequently, asphalt roadway surfaces periodically need to be replaced. The worn roadway surface must be removed before it can be replaced. A cold planer machine, also referred to as an asphalt milling machine, is used to break apart and remove asphalt layers from a roadway to prepare the roadway for repaving.

Cold planers often include a frame supported by multiple track or wheel elements that are driven by an engine. The cold planer further includes a milling assembly including one or more milling drums that rotate underneath the frame to engage cutting tools with the surface of the roadway to break apart (e.g., mill) the surface of the roadway. Broken-up pieces of roadway surface are conveyed away from the cold planer via a series of conveyor assemblies. A first conveyor assembly transfers the broken-up material from an underside of the cold planer to a second conveyor assembly, and the second conveyor assembly will convey the material away from the cold planer into a bed of a truck, for example. The truck will move the broken-up material from the roadway to some other location, such as a reclamation facility where the broken-up material can be reused as aggregate for new asphalt or otherwise recycled. Generally, after material is deposited into the bed of a first truck, a second truck will be positioned under the second conveyor assembly to receive additional material. This process is repeated until substantially all of the broken-up material is removed from the roadway.

In order to make efficient use of trucks, it may be desirable to avoid underfilling a truck bed as this would require more truckloads to remove the broken-up material. On the other hand, it may be desirable to avoid over-filling trucks as trucks with overweight loads can incur substantial financial penalties. To ensure trucks are neither over-filled nor under-filled, it is necessary to monitor an amount (e.g., a mass) of material conveyed from the cold planer into a truck bed. Accurately measuring a mass flow rate of material conveyed from the cold planer to the truck bed is difficult as the mass flow rate varies as a tension on the conveyor belt changes, as the conveyor belt slips, and/or as environmental parameters (e.g., temperature or moisture) change. Without reliable mass flow rate measurements, operators may resort to underfilling trucks to mitigate the risk of financial penalty, resulting in suboptimal utilization of trucks hauling broken-up roadway material.

SUMMARY

One aspect of the present disclosure is related to a cold planer. The cold planer includes a conveyor system having a conveyor belt, a frame, and a roller rotatably coupled to the frame, a motor coupled to the conveyor belt and configured to drive the conveyor belt, a tension screw coupled between the roller and the frame, a tension sensor configured to measure the tension on the conveyor belt, and a controller communicably coupled with the tension sensor and the motor. The controller is configured to receive the tension from the tension sensor and calculate, based on the tension from the tension sensor, a mass flow rate of material on the conveyor belt.

Another aspect of the present disclosure is related to a cold planer. The cold planer includes a conveyor system having a conveyor belt, a frame, and a roller rotatably coupled to the frame, a motor coupled to the conveyor belt and configured to drive the conveyor belt, a tension screw coupled between the roller and the frame, a tension load cell mounted axially along the tension screw and configured to measure the tension on the conveyor belt, and a controller communicably coupled with the tension load cell and the motor. The controller is configured to calculate a mass flow rate of material on the conveyor belt, detect, from the tension load cell, a change in the tension of the conveyor belt, and adjust, based on the change in the tension, the calculated mass flow rate.

Another aspect of the present disclosure is related to a method for calculating a mass flow rate of material on a cold planer. The method includes measuring, via a tension sensor coupled to a tension screw, a tension of a conveyor belt, calculating, based on the tension measured by the tension sensor, a mass flow rate of material on the conveyor belt, detecting a change in the tension of the conveyor belt, and in response to detecting the change in the tension of the conveyor belt, adjusting the calculated mass flow rate of material.

DETAILED DESCRIPTION

Figure 1:
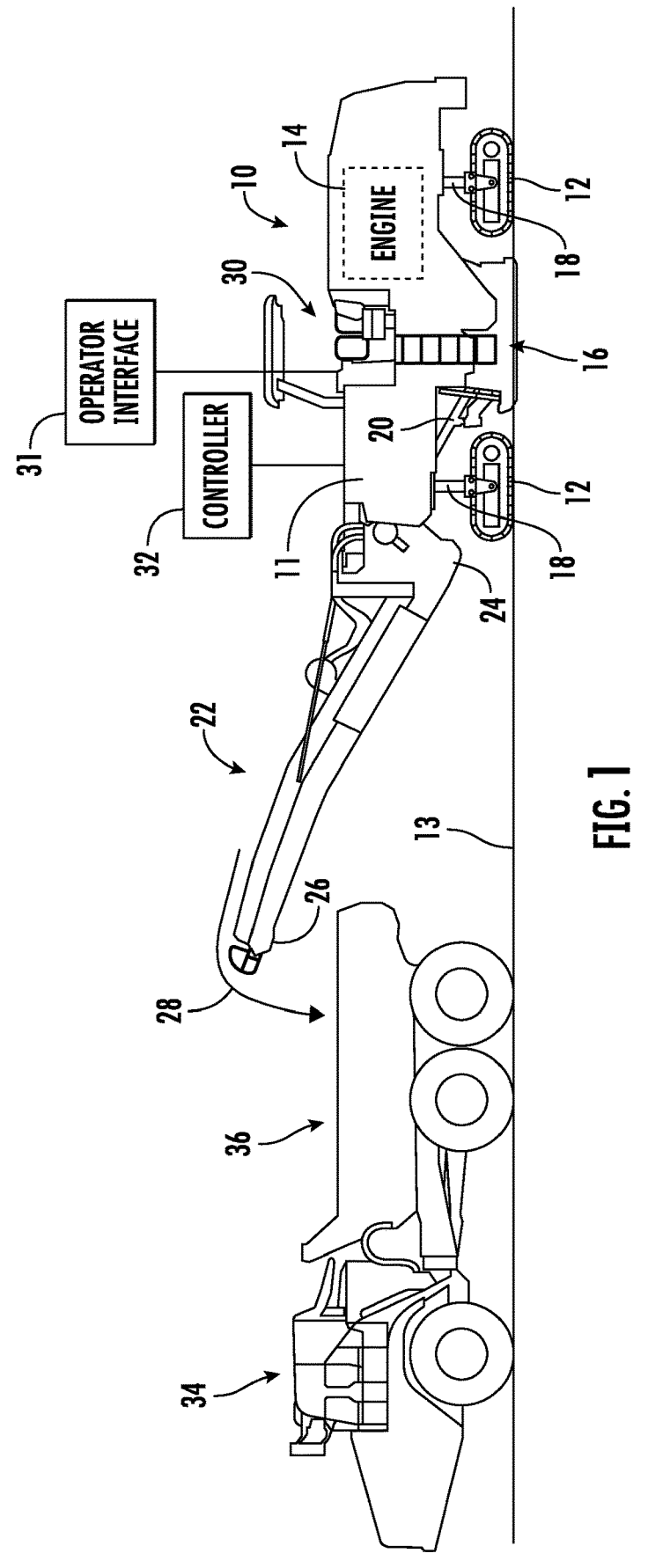
FIG. 1 is a side view of a machine having a conveyor system, according to an exemplary embodiment.
Figure 2:
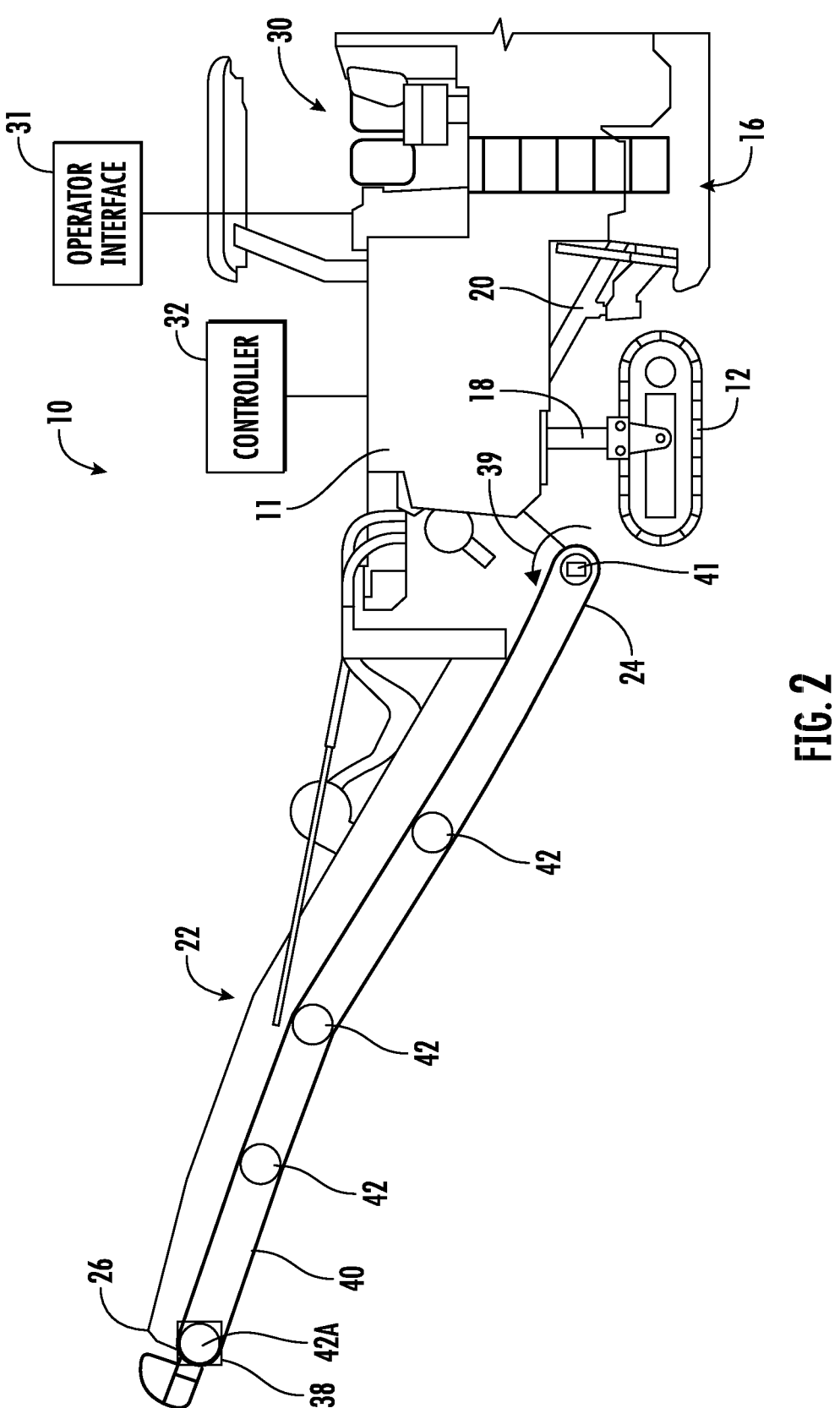
FIG. 2 is a side view of the conveyor system of the machine of FIG. 1, in accordance with an exemplary embodiment.

Referring to FIGS. 1 and 2, among others, a machine 10 is shown as a cold planer 10. The cold planer 10 includes a frame 11 supported by one or more tractive elements 12, shown as tracked wheels 12. The cold planer 10 further includes an engine 14 mounted to the frame 11 and a milling assembly 16 supported on an underside of the frame 11. The milling assembly 16 includes at least one milling drum configured to rotate when driven by the engine 14. The rotation of the milling drum causes at least one cutting element extending from the milling drum to cut (e.g., mill, break apart) a surface 13 of a roadway. Each of the tracked wheels 12 are coupled to the frame 11 via an actuator 18. The actuators 18 are configured to extend or retract to raise and lower the frame 11 relative to the surface 13. As the actuators 18 cause the frame 11 to lower relative to the surface 13, the cutting teeth of the milling assembly 16 can cut the surface 13 at a greater (e.g., deeper) depth. As the actuators 18 cause the frame 11 to rise relative to the surface 13, the cutting teeth of the milling assembly 16 can cut the surface at a lesser (e.g., shallower) depth. In some embodiments, the same actuators 18 or different actuators can be used to steer the cold planer 10 and or to adjust a travel speed of tracked wheels 12.

The cold planer 10 includes a first conveyor system 20 and a second conveyor system 22. The first conveyor system 20 includes a conveyor belt coupled with at least one rotatable roller and a motor. The motor is operatively coupled to the conveyor belt (e.g., via a roller) to drive the conveyor belt around the roller. The movement of the conveyor belt is configured to convey material away from the milling assembly 16. For example, the milling assembly 16 can mill (e.g., cut, break apart) the surface 13 to create milled material (e.g., broken-up asphalt material) that is conveyed away from the milling assembly 16 via the first conveyor system 20. The amount of milled material conveyed from the milling assembly 16 via the conveyor system 20 depends at least in part on a depth at which the cutting teeth of the milling assembly 16 cut into the surface 13. For example, if the actuators 18 are actuated to lower the frame 11 of the cold planer 10 towards the surface 13, the milling assembly 16 will correspondingly be positioned lower such that the cutting teeth of the milling assembly 16 will cut the surface 13 to a greater depth, resulting in a greater amount (e.g., volume) of milled material being removed from the surface 13.

The first conveyor system 20 is configured to provide the milled material to the second conveyor system 22. The conveyor system 22 includes a proximal end 24 positioned near a leading end of the cold planer 10 and a distal end 26 positioned away from the leading end of the cold planer 10. The conveyor system 22 is pivotally connected at a leading end to frame 11 such that an angle of the conveyor system 22 can be varied relative to surface 13 or the frame 11. For example, the distal end 26 of the conveyor system 22 can be raised or lowered relative to the proximal end 24 to adjust the angle of the conveyor system 22 relative to a surface 13 or to the frame 11. The cold planer 10 includes an angle sensor 41 coupled with the conveyor system 22 and configured to determine an angle of the conveyor system 22 relative to the frame 11 of the cold planer 10 or relative to the surface 13. For example, the angle sensor 41 could be an inclinometer, an optical sensor, an encoder, or some other sensor configured to determine an angle of the conveyor system 22. The conveyor system 22 includes a conveyor belt 40 driven by a motor 38 and configured to move in a conveyance direction 28 about a plurality of rotatable rollers 42. The conveyor system 22 includes the motor 38 driving the conveyor belt 40 along the rollers 42 from the distal end 26 of the conveyor system 22. Specifically, the distal end 26 of the conveyor system 22 can include a roller 42 or a drum that is driven by the motor 38 (e.g., a drive roller 42A), and the proximal end 24 can include a roller 42 that rotates as the motor 38 drives the conveyor belt 40. Accordingly, the conveyor system 22 includes the conveyor belt 40 driven by the motor 38 at one location and supported by rollers 42 at multiple other locations (e.g., idle rollers).

Milled material (e.g., broken-up asphalt material) is conveyed in the conveyance direction 28 as the conveyor belt 40 is driven by the motor 38. As depicted in FIG. 2, among others, the motor 38 is coupled with the conveyor belt 40 and configured to drive the conveyor belt 40 along the rollers 42. The motor 38 is configured to drive the conveyor belt 40 at a conveyance speed such that milled material can be conveyed from the conveyor belt 40 and into the bed 36 of the truck 34 at substantially the same conveyance speed. The motor 38 can rotate in a direction 39 to drive the conveyor belt 40 and cause the milled material to be conveyed in the conveyance direction 28. In some examples, the motor 38 can be a hydraulic motor, an electric motor, or some other motor. In various embodiments, the motor 38 can be powered by the engine 14 or by some other power source.

The cold planer 10 can be employed at a worksite, (e.g., a roadway) to perform a roadway milling operation. In an example milling operation, the cold planer 10 milling assembly 16 can be used to break apart (e.g., mill, cut) the surface 13 of the roadway. The conveyor belt of the first conveyor system 20 transfers milled material from the milling assembly 16 and to the second conveyor system 22. The motor 38 of the second conveyor system 22 rotates in the direction 39 to convey the milled material in the conveyance direction 28. The milled material is conveyed from (e.g., off of) the distal end 26 of the conveyor system 22 in the conveyance direction 28 and into a bed 36 of a truck 34. The truck 34 can be a haul truck, such as a dump truck (e.g., an articulating dump truck), or some other truck having a bed, hopper, or other vessel configured to collect milled material. Milled material is deposited in the bed 36 of the truck 34 via the conveyor system 22. Once the bed 36 of the truck 34 is filled to a desirable level (e.g., with a desirable mass milled material), the truck 34 will move the milled material from the roadway to some other location, such as a reclamation facility where the broken-up material can be reused as aggregate for new asphalt or otherwise recycled. During the example milling operation, milled material can be further conveyed into the bed 36 of a second truck 34 that can be positioned proximate the distal end 26 of the conveyor system 22. This process is repeated until the milled material from the surface 13 of the roadway is removed, for example.

Still referring to FIGS. 1 and 2, among others, the cold planer 10 includes an operator station 30. The operator station 30 includes at least one operator interface 31. The operator interface 31 is used to control the cold planer 10 or to provide an indication to an operator of the cold planer 10. In some embodiments, the operator interface 31 can be configured to receive operator input to control or monitor the cold planer 10. For example, the operator interface 31 can include a display screen and one or more input devices (e.g., switches, buttons, levers, joysticks, touchscreen displays, or other input devices) to receive an input from an operator to control the cold planer 10 or a parameter of the cold planer (e.g., a speed of the conveyor belt 40, a tension on the conveyor belt 40, or some other parameter). In some embodiments, the operator interface 31 can be configured to provide an indication to an operator of a current state of the cold planer 10 or a component thereof. For example, the operator interface 31 can include a display screen (e.g., an LCD display, an LED display, or some other display device), one or more illuminating elements (e.g., LED lights, lamps, or other illuminating devices), one or more audible elements (e.g., a speaker, a siren, or some other audible device), among other devices. In other embodiments, operator station 30 or the operator interface 31 may be offboard (e.g., remotely located with respect to) the cold planer 10. For example, the operator interface 31 can be or include a remote control, such as a handheld controller or mobile device, that an operator can use to control the cold planer 10 from a remote location (e.g., proximate the roadway or otherwise). The operator station 30 or the operator interface 31 can be or include a software program and user interface for a computer, and may include a combination of hardware and software.

Figure 8:
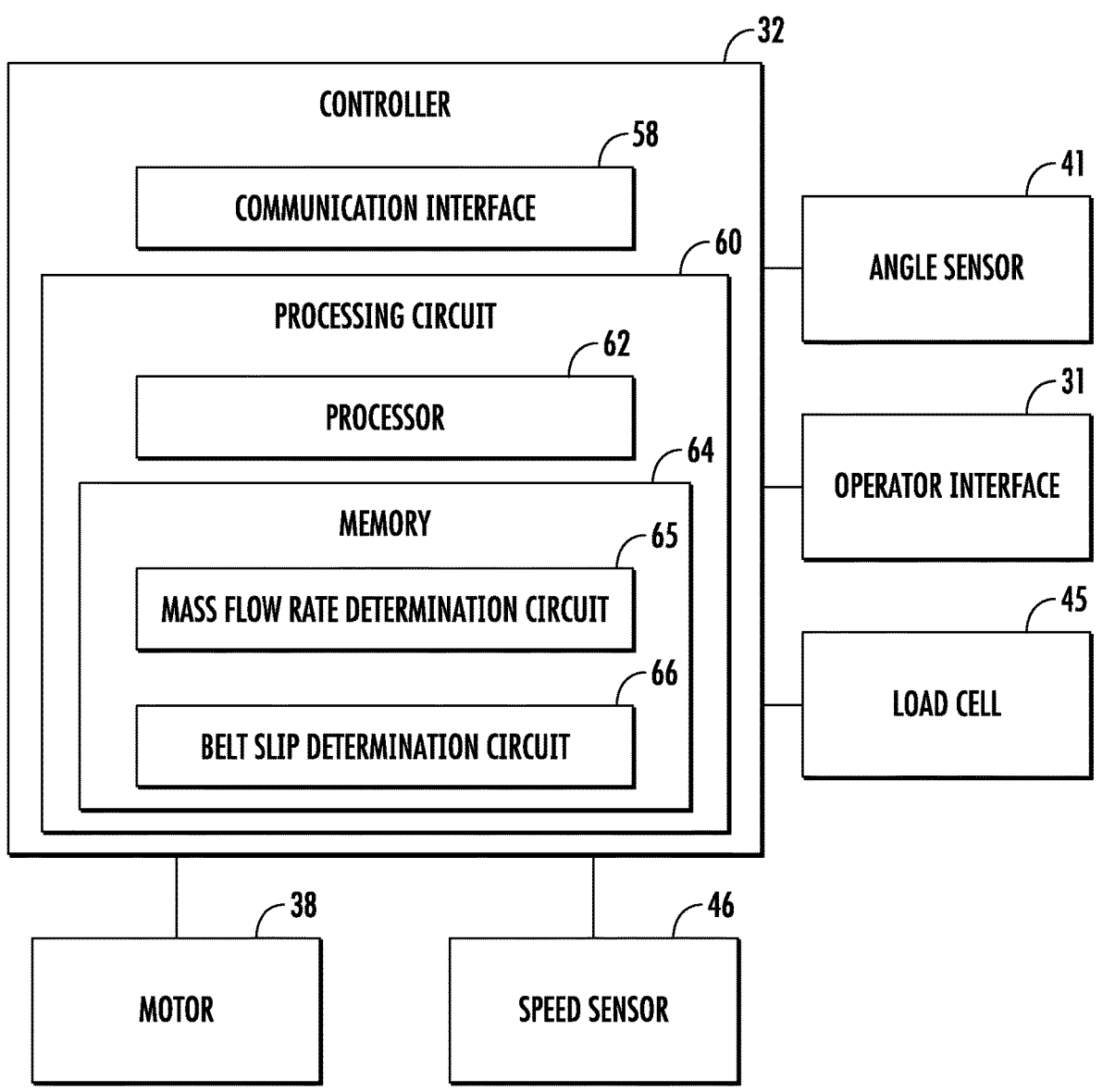
FIG. 8 is a block diagram of a controller of the machine of FIG. 1, in accordance with an exemplary embodiment.

The cold planer 10 includes a controller 32. The controller 32, which is discussed in detail below with reference to FIG. 8, is communicably coupled with one or more components of the cold planer 10. Specifically, the controller 32 is communicably coupled with the motor 38, the operator interface 31, and one or more sensors, as discussed below. The controller 32 is configured to receive data pertaining to the operation or state of the cold planer 10. The controller 32 is further configured to monitor or control an operation of the cold planer 10. For example, in some embodiments, the controller 32 can determine a mass flow rate of milled material on the conveyor belt 40 of the conveyor system 22, as is discussed in detail below. The controller 32 can be embodied on the cold planer 10 (e.g., as a physical component coupled with the cold planer 10), in the cloud (e.g., as a remotely located controller), or some combination thereof. For example, the cold planer 10 can include an onboard controller 32 and an offboard controller 32, where each performs separate functions or the same functions.

Figure 3:
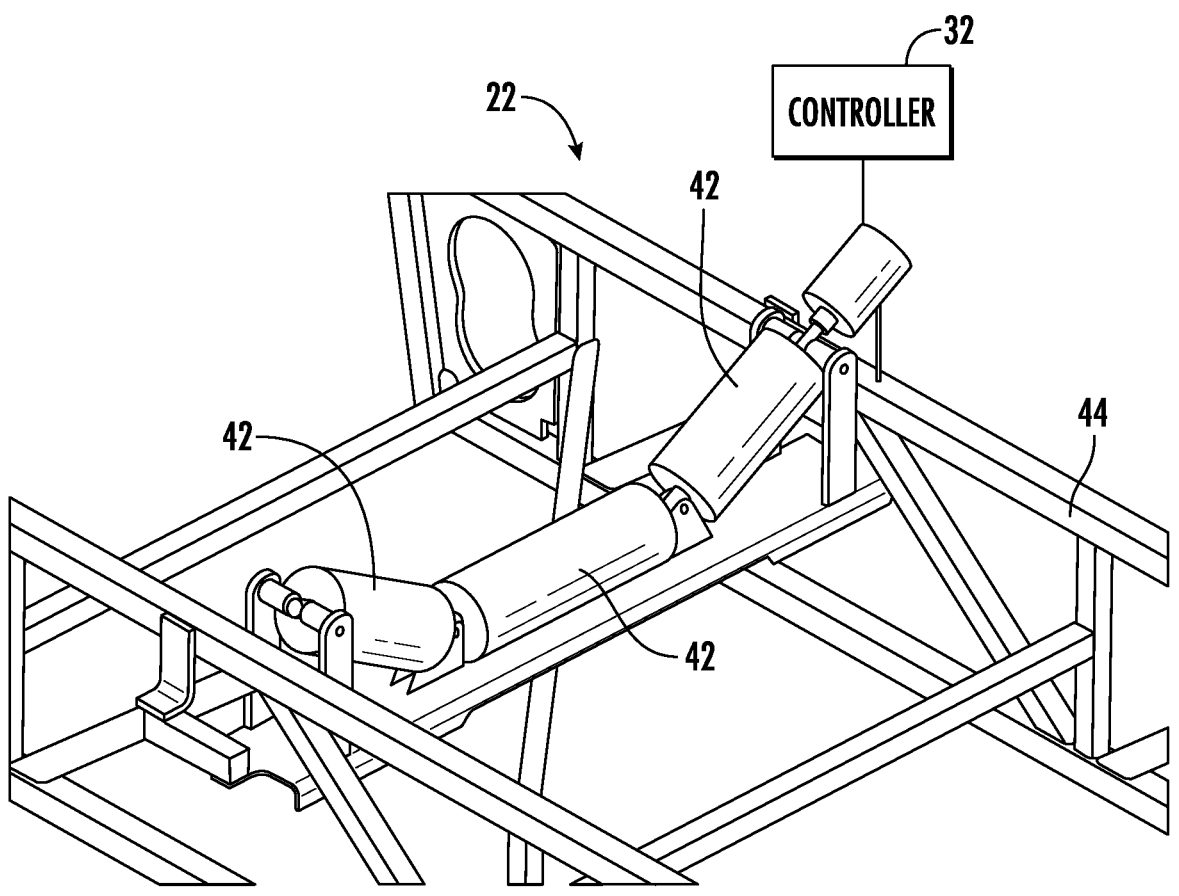
FIG. 3 is a detail view of a roller of the conveyor system of FIG. 2 with the conveyor belt removed, in accordance with an exemplary embodiment.
Figure 4:
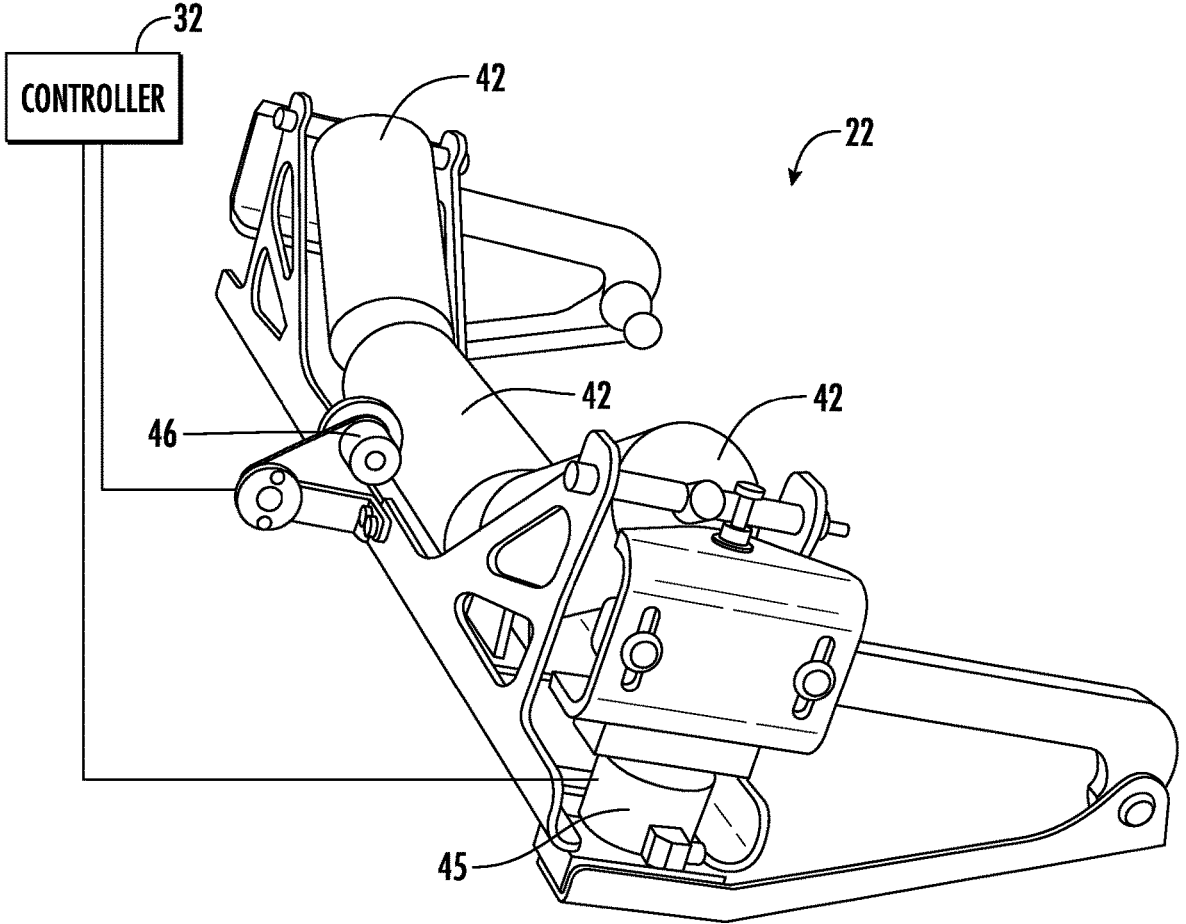
FIG. 4 is a detail view of a roller and speed sensor of the conveyor system of FIG. 2 with the conveyor belt removed, in accordance with an exemplary embodiment.
Figure 5:
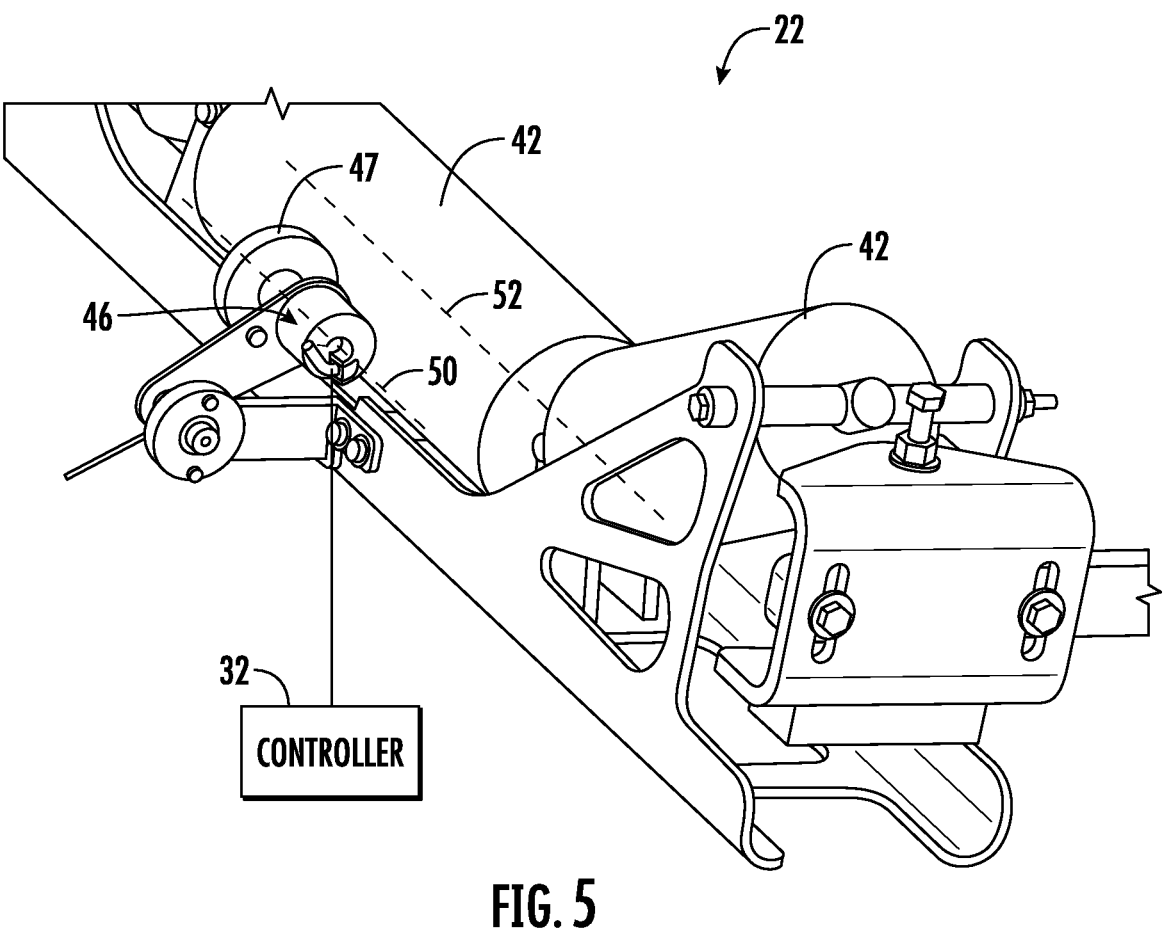
FIG. 5 is a detail view of a roller and speed sensor of the conveyor system of FIG. 2 with the conveyor belt removed, in accordance with an exemplary embodiment.

As depicted in FIGS. 3-5, among others, the conveyor system 22 of the cold planer 10 includes a frame 44 to rotatably support the rollers 42. The rollers 42 rotate with respect to the frame 44 via bearings or other friction-reducing elements such that the rollers 42 can freely rotate with respect to the frame 44. In some examples, each of the rollers 42 freely rotates relative to the frame 44 to facilitate the movement of the conveyor belt 40 as the motor 38 drives the conveyor belt 40. In some embodiments, each of the rollers 42 defines a roller assembly that includes multiple rollers 42 supported on the frame 44 at the same position. In the embodiment depicted in FIGS. 3-5, for example, the multiple rollers 42 can be coupled to the frame 44 at the same position along the frame 44 (e.g., at the same position between the proximal end 24 and the distal end 26). Outermost rollers 42 are angled with respect to a central roller 42 such that the conveyor belt 40 supported by the rollers 42 includes a generally concave or similar form factor. More specifically, the outermost rollers 42 extend at an upward angle from the central roller 42 to form angled sides of the conveyor belt 40, which operate to keep the milled material on the conveyor belt 40 (e.g., to prevent milled material from spilling off the conveyor belt 40).

As noted above, the motor 38 drives the conveyor belt 40 as the motor 38 or some element of the motor 38 or operatively coupled with the motor 38 (e.g., a roller, a shaft, or other drive mechanism) rotates in the direction 39. The motor 38 generates a force (e.g., a torsional force) that is imparted on the conveyor belt 40 to cause that conveyor belt 40 to move. The motor 38 imparts the force on the conveyor belt 40 via a friction force. Specifically, friction between the belt 40 and the motor 38 drives the conveyor belt 40 (and milled material supported by the conveyor belt 40) as the motor 38 is operated. If the friction force between the motor 38 and the conveyor belt 40 is overcome, however, the conveyor belt 40 can "slip" relative to the motor 38. In instances where the conveyor belt 40 slips, the motor 38 will be operating to drive the conveyor belt 40 at a desired conveyance speed, but the conveyor belt 40 will be moving at an actual conveyance speed that is less than the desired conveyance speed. The conveyor belt 40 can slip relative to the motor 38, for example, as an underside of the conveyor belt 40 becomes worn, as a temperature of the conveyor belt 40 varies, as a speed of the motor 38 increases (e.g., as the torsional force momentarily exceeds the friction force), as tension in the conveyor belt 40 decreases, or for other reasons.

The rollers 42 support the conveyor belt 40 as the motor 38 drives the conveyor belt 40. The rollers 42 are free rotate as the conveyor belt 40 moves. In other words, the rollers 42 are not driving the conveyor belt 40 but are instead driven via movement of the conveyor belt 40. The conveyor belt 40 rides along the rollers 42 that are supported by the frame 44 of the conveyor system 22. As the conveyor belt 40 moves, a friction force is imparted by the conveyor belt 40 on the rollers 42, causing the rollers 42 to roll in the direction 39 as the conveyor belt 40 moves. The friction between an outer surface of the roller 42 and an underside of the conveyor belt 40 causes the rollers 42 to move.

As depicted in FIGS. 3-5, among others, a speed sensor 46 is operatively coupled with the conveyor system 22. The speed sensor 46 is configured to determine a speed of the roller 42, a speed of the conveyor belt 40, or a speed of some other component or element that moves with (e.g., at the same speed as) the conveyor belt 40. In some examples, the speed sensor 46 can be a contactless encoder, such as a magnetic speed sensor, an optical speed sensor, a hall effect speed sensor encoder, or some other speed sensor. The speed sensor 46 is configured to measure the rotational speed of an object operatively coupled with the conveyor belt 40. As depicted in FIG. 3, for example, the speed sensor 46 is an optical, magnetic, or hall effect sensor configured to measure the rotational speed of the roller 42 on which the conveyor belt 40 rides. Based on the speed of the roller 42, the speed of the conveyor belt 40 can be inferred.

As depicted in FIG. 5, among others, the speed sensor 46 is a rotary encoder that includes a wheel 47. The wheel 47 rotates about an axis 50 and contacts the roller 42 or the conveyor belt 40. The axis 50 of the wheel 47 is parallel or substantially parallel (e.g., ±15° from parallel) to an axis 52 of the roller 42 about which the roller 42 rotates. Movement of the roller 42 about the axis 52 or the conveyor belt 40 causes the wheel 47 of the speed sensor 46 to rotate at a speed corresponding to the speed of the roller 42 or the conveyor belt 40 with which the wheel 47 is in contact. The speed sensor 46 is configured to determine a speed of the wheel 47, which is indicative of the speed of the roller 42 or the speed of the conveyor belt 40.

In embodiments where the speed sensor 46 is configured to measure the speed of the conveyor belt 40, such as when the speed sensor 46 is a rotary encoder having a wheel 47 that rides along the conveyor belt 40, the speed sensor 46 can obtain a speed measurement from a tight side of the conveyor belt 40, rather than on a slack side of the conveyor belt 40. As discussed above, the conveyor belt 40 is configured to roll along the rollers 42 and be driven by the motor 38. Specifically, the conveyor belt 40 forms a continuous loop having a top side and a bottom side with the rollers 42 the motor 38 (or some driving component of the motor 38) positioned between the top side and the bottom side. As the motor 38 drives the conveyor belt 40 around the rollers 42, one of the top side or the bottom side of the conveyor belt 40 is a tight side (e.g., a side in tension) while the other side is a slack side (e.g., a compressed side). For example, in the arrangement depicted in FIG. 2 having the motor 38 positioned on the proximal end 24 of the conveyor system 22 and rotating in the direction 39, the tight side of the conveyor belt 40 is the bottom side and the slack side is the top side. In other embodiments (e.g., embodiments where the motor 38 is positioned at the distal end, for example), the tight side of the conveyor belt 40 is the top side. The tight side of the conveyor belt 40 moves faster than the slack side of the conveyor belt 40. For example, the tight side of the conveyor belt 40 provides a more accurate indication of a speed of the conveyor belt 40. To improve accuracy of a resultant speed measurement, the speed sensor 46 is configured to measure the speed of the conveyor belt 40 on the tight side of the conveyor belt 40.

As depicted in FIGS. 3-5, among others, the speed sensor 46 is configured to measure the speed of the conveyor belt 40 at or proximate to (e.g., within 12 inches of) the roller 42. For example, the speed sensor 46 is configured to measure the speed of the conveyor belt 40 at one of the rollers 42 of the conveyor system 22. The roller 42 near which the speed sensor 46 obtains the speed measurement can be an intermediate roller 42 (e.g., a roller positioned between the proximal end 24 and the distal end 26 of the conveyor system 22), a roller at the distal end 26 of the conveyor system 22, or some other roller 42. As noted above, the speed sensor 46 can be configured to measure the speed of the conveyor belt 40 independent of a roller 42 in other embodiments.

As depicted in FIG. 4, among others, the conveyor system 22 includes a load cell 45. The load cell 45 is configured to measure a force applied by the conveyor belt 40 (and milled material supported by the conveyor belt 40) to the frame 44 of the conveyor system 22. As shown in FIG. 4, the load cell 45 is positioned between the roller 42 and the frame 44 and is configured to measure the force applied by the conveyor belt 40 at (e.g., underneath) the roller 42. The load cell 45 is positioned to measure the force applied by the conveyor belt 40 at the same roller 42 proximate to which the speed sensor 46 is positioned to measure the speed of the conveyor belt 40. For example, the speed sensor 46 is positioned to measure a speed of the roller 42 (that corresponds to the speed of the conveyor belt 40) and the load cell 45 is positioned to measure a force applied by the conveyor belt 40 at that same roller. In some examples, the load cell 45 can be a single column load cell, a multiple column load cell, a donut/pancake load cell, an S-type load cell, or some other type of force transducer. For example, the load cell 45 can be any type of load cell that is configured to measure a compressive force applied by the conveyor belt 40 to the frame 44 of the conveyor system 22. The load cell 45 is communicably coupled with the controller 32 and is configured to transmit an indication of a force applied by the conveyor belt 40 (and milled material supported by the conveyor belt 40) to the controller 32. For example, the load cell 45 can transmit periodic or continuous signals to the controller 32.

Figure 6:
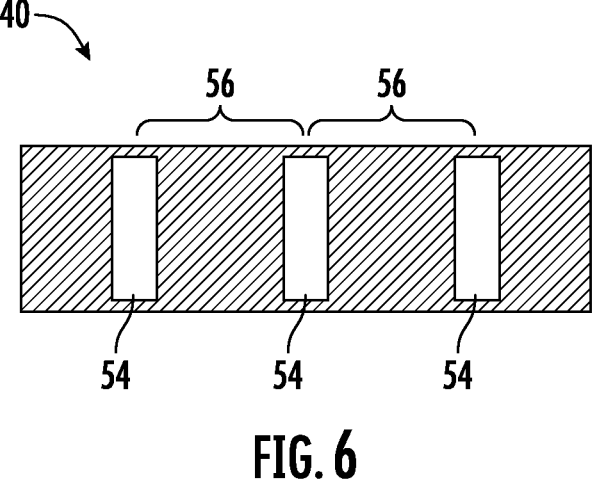
FIG. 6 is a side view of the conveyor belt of the conveyor system of FIG. 2, in accordance with an exemplary embodiment.
Figure 7:
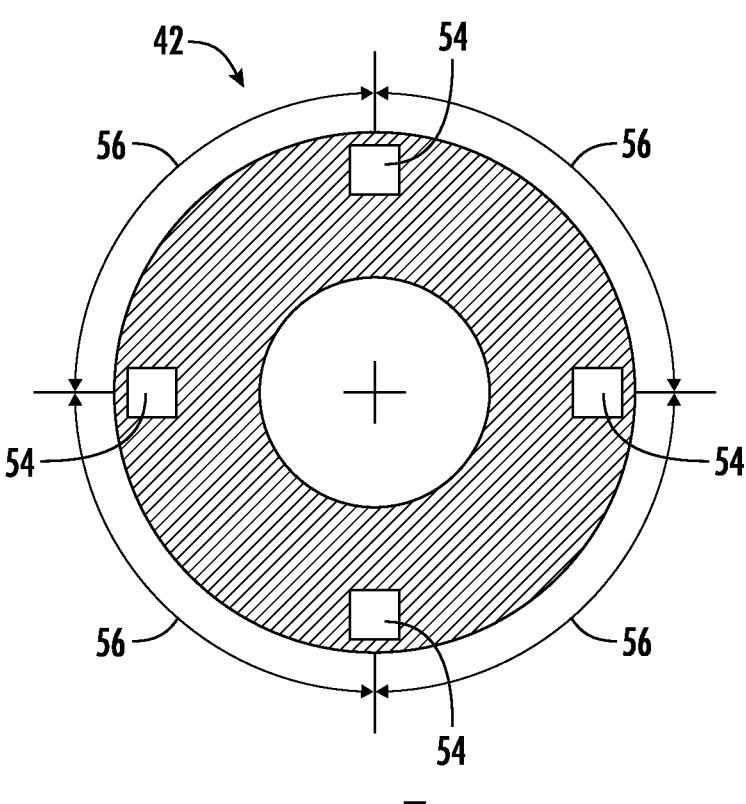
FIG. 7 is a side view of a roller of the conveyor system of FIG. 2, in accordance with an exemplary embodiment.

Referring now to FIGS. 6 and 7, the conveyor belt 40 or the roller 42 include a plurality of speed sensing elements 54 for use with a contactless speed sensor 46, such as an optical speed sensor 46 or a magnetic speed sensor 46, among others. As depicted in FIG. 6, among others, the conveyor belt 40 includes a plurality of speed sensing elements 54. As depicted in FIG. 7, among others, the roller 42 includes a plurality of speed sensing elements 54. The speed sensing elements 54 are coupled with a side or edge of the conveyor belt 40 or a side or edge of the roller 42. For example, the speed sensing elements 54 can be metallic elements molded within the conveyor belt 40 or coupled with (e.g., adhered to) the conveyor belt 40 or roller 42. The metallic speed sensing elements 54 are readily detectable by a magnetic speed sensor 46, for example. The speed sensing elements 54 can be colored, protruded, indented, or otherwise distinctive markings on the conveyor belt 40 that are readily detectable by an optical speed sensor 46, for example. The speed sensing elements 54 are spaced apart by a distance 56. The distance 56 between adjacent speed sensing elements 54 is substantially uniform distance. As the conveyor belt 40 moves or as the roller 42 rotates, the speed sensor 46 is configured to detect the movement of the speed sensing elements 54 to determine a speed of the conveyor belt 40 or the roller 42. For example, the magnetic speed sensor 46 can be mounted to the frame 44 of the conveyor system 22 and positioned to sense the plurality of speed sensing elements 54 passing by the magnetic speed sensor 46 as the conveyor belt 40 or the roller 42 moves. In another example, the optical speed sensor 46 can be mounted to the frame 44 of the conveyor system 22 and positioned to observe the plurality of speed sensing elements 54 passing the by the speed sensor 46 as the conveyor belt 40 or the roller 42 moves. Because the distance 56 is a substantially uniform distance, the speed or rate at which the speed sensing elements 54 pass the speed sensor 46 can correspond to the speed of the conveyor belt 40 or the roller 42.

Referring now to FIG. 8, among others, a schematic of the controller 32 is shown. The controller 32 includes a communication interface 58 and a processing circuit 60. The processing circuit 60 includes a processor 62 and a memory 64. The memory 64 includes a mass flow rate determination circuit 65 and a belt slip determination circuit 66, among other circuits. In other embodiments the mass flow rate determination circuit 65 and the belt slip determination circuit 66 are application-specific circuitry that is not stored in the memory 64. In yet another embodiments, the mass flow rate determination circuit 65 and the belt slip determination circuit 66 are computer-executable code that are stored in one or more memory devices located remotely from the controller 32 or the cold planer 10. The controller 32 is configured to control and monitor (e.g., by receiving data from sensors) various functions of the cold planer 10 such as the operation of the conveyor system 22, the motor 38 of the conveyor system 22, the operator interface 31, or other components coupled with or located remotely from the cold planer 10.

The controller 32 is communicably coupled with the angle sensor 41, the operator interface 31, the load cell 45, the motor 38, and the speed sensor 46, among other components of the cold planer 10. Data recorded by the angle sensor 41, the load cell 45, or the speed sensor 46 are transmitted to and received by the controller 32, where such data can be saved, analyzed, or otherwise used. Likewise, the controller 32 is configured to receive data, commands, or other information transmitted from the operator interface 31.

The communication interface 58 of the controller 32 is configured to enable the controller 32 to exchange information over a wired or wireless network. In some examples, the communication interface 58 can include program logic that facilitates connection of the controller 32 to a network (e.g., a cellular network, Wi-Fi, Bluetooth, radio, etc.) for wireless communication. For example, the communication interface 58 can support communications between the controller 32 and other systems, such as a remote monitoring computing system (e.g., a cloud-based fleet management service, or some other remotely located computing system). In instances where the communication interface 58 is configured for wireless communication, the communication interface 58 can include a cellular modem, a Bluetooth transceiver, a radio-frequency identification (RFID) transceiver, and a near-field communication (NFC) transmitter, or some other short-range wireless transceiver. In some embodiments, the communication interface 58 includes the hardware and machine-readable media sufficient to support communication over multiple channels of data communication simultaneously or separately.

The communication interface 58 is configured to facilitate the transmission of data and commands between the controller 32 and various other systems or devices (e.g., the angle sensor 41, the operator interface 31, the load cell 45, the motor 38, and the speed sensor 46, or some other system or device associated with the cold planer 10). In such embodiments, the communication interface 58 can communicate with other systems or devices via an internal communications network, such as a controller area network (CAN bus) or another vehicle electronic communications protocol. Each of the angle sensor 41, the operator interface 31, the load cell 45, the motor 38, and the speed sensor 46 are communicably coupled to the controller 32 via the communication interface 58 using a CAN bus network or similar protocol.

The controller 32 includes the processing circuit 60, which further includes a processor 62 and a memory 64. The processor 62 is coupled to the memory 64. In some embodiments, the processor 62 can be a general purpose or specific purpose processor, an application specific integrated circuit (ASIC), one or more field programmable gate arrays (FP-GAs), a group of processing components, or other suitable processing components. The processor 62 can be configured to execute computer code or instructions stored in the memory 64 or received from other computer readable media (e.g., CDROM, network storage, a remote server, etc.).

The memory 64 includes one or more devices (e.g., memory units, memory devices, storage devices, etc.) for storing data and/or computer code for completing and/or facilitating various processes. For example, the memory 64 can include random access memory (RAM), read-only memory (ROM), hard drive storage, temporary storage, non-volatile memory, flash memory, optical memory, or any other suitable memory for storing software objects and/or computer instructions. The memory 64 can include database components, object code components, script components, or any other type of information structure for supporting the various activities and information structures described in the present disclosure. The memory 64 is communicably connected to the processor 62 via processing circuit 60. The memory 64 includes computer code for executing (e.g., by the processor 62) one or more of the processes associated with the cold planer 10. Specifically, the memory 64 includes computer code for executing one or more of the processes associated with determining a mass flow rate of milled material conveyed along the conveyor belt 40 via the mass flow rate determination circuit 65. The memory 64 further includes computer code for executing one or more processes associated with determining an amount of belt slippage of the conveyor belt 40 via the belt slip determination circuit 66.

The mass flow rate determination circuit 65 of the controller 32 is configured to determine and control the material mass flow rate (e.g., the rate of material transfer into the truck 34), among other parameters. The mass flow rate of milled material conveyed by the conveyor system 22 and into the bed 36 of the truck 34 can be determined in a variety of ways. Specifically, the mass flow rate can be determined by: (1) a volume-based calculation method that considers an estimated volume of milled material removed by the milling assembly 16 as the cold planer 10 traverses the surface 13; (2) a conveyor drive power-based calculation that considers the drive power of the conveyor system 22 (e.g., the drive power of the motor 38) over time; and/or (3) a force and belt speed-based calculation method that considers a force applied to the conveyor belt 40 and a speed of the conveyor belt 40, among other parameters. In other embodiments, the mass flow rate determination circuit 65 can use other calculation methods.

The mass flow rate determination circuit 65 is configured to determine the mass flow rate of the milled material using the volume-based calculation method, which considers an estimated volume of milled material removed from the surface 13 by the milling assembly. To employ this calculation method, the mass flow rate determination circuit 65 uses known parameters of the cold planer 10 and measured operating parameters of the cold planer 10. For example, as noted above, the milling assembly 16 cuts into the surface 13 of the roadway to create milled material (e.g., broken up pieces of asphalt). More specifically, the milling assembly 16 cuts into the surface 13 to create a volume of milled material, where the volume of milled material can be expressed, for example, as a function of (i) a cutting depth into the surface 13, (ii) a width of the milling drum of the milling assembly 16 (e.g., a width of the milling drum having cutting teeth that engage the surface 13), and (iii) a distance traversed by the cold planer 10 along the surface 13 while the milling assembly 16 is cutting the surface 13 at the depth (i). The volume of milled material can be varied as the depth at which the cutting teeth cut the surface 13 is varied. The mass flow rate determination circuit 65 can determined the mass flow rate of milled material by computing the volume of material removed by the milling assembly 16 using these parameters over a given time interval. The mass flow rate determination circuit 65 can determine a mass of milled material removed by multiplying the volume of material removed by an estimated (e.g., known) or measured density of the material of the surface 13, for example.

Similarly, the mass flow rate determination circuit 65 can determine a volumetric flow rate of milled material removed by the milling assembly 16 of the cold planer 10. The volumetric flow rate of milled material can be expressed as a function of (i) the cutting depth into the surface 13, (ii) the width of the milling drum of the milling assembly 16 (e.g., a width of the milling drum having cutting teeth that engage the surface 13), and (iii) a rate at which the cold planer 10 is traversing the surface 13 while the milling assembly 16 is cutting the surface 13 at the depth (i). The mass flow rate determination circuit is configured to calculate the volumetric flow rate of milled material based on these parameters. The mass flow rate determination circuit 65 is configured to determine the mass flow rate of milled material using the volumetric flow rate of milled material. For example, the volumetric flow rate can be multiplied by an estimated (e.g., known) or measured density of the milled material to determine a mass flow rate of milled material.

The mass flow rate determination circuit 65 of the controller 32 is configured to determine the mass flow rate of milled material using the conveyor drive power-based calculation method. Specifically, the mass flow rate determination circuit 65 is configured to determine the mass flow rate of the milled material based on a drive power of the conveyor system 22 or parameters related to the drive power of the conveyor system 22. Specifically, the mass flow rate determination circuit 65 can receive a signal indicative of a drive power of the motor 38, such as a hydraulic pressure associated with the motor 38 (e.g., in embodiments where the motor 38 is a hydraulic motor) and a hydraulic temperature (e.g., a temperature of hydraulic oil associated with the motor 38). The mass flow rate determination circuit 65 is configured to receive a signal from the angle sensor 41 indicative of an angle of the conveyor system 22 relative to the surface 13 or relative to the frame 11 of the cold planer 10. In addition, the mass flow rate determination circuit 65 is configured to receive a signal indicative of the speed of the conveyor belt 40 and a signal indicative of a tension of the conveyor belt 40. Based on one or more of the hydraulic pressures associated with the motor 38, the temperature of the hydraulic fluid of the motor 38, the angle of the conveyor system 22, the speed of the conveyor belt 40, and the tension on the conveyor belt 40, the mass flow rate determination circuit 65 is configured to compute the mass flow rate of milled material conveyed by the conveyor belt 40. For example, an increased hydraulic pressure of the motor 38 or an increased tension on the conveyor belt 40 might indicate the presence of a large mass on the conveyor belt 40 and thus a relatively large mass flow rate of milled material. To the contrary, a reduced tension on the conveyor belt 40 or a reduced hydraulic pressure of the motor 38 might indicate a lesser mass on the conveyor belt 40 and thus a relatively small mass flow rate of milled material.

The mass flow rate determination circuit 65 of the controller 32 is configured to determine the mass flow rate of milled material being transferred by the conveyor belt 40 of the conveyor system 22 using the force and belt speed-based calculation method. Specifically, the mass flow rate determination circuit 65 is configured to determine the mass flow rate of the milled material based on a force applied to the conveyor belt 40 and a speed of the conveyor belt 40 or the motor 38. For example, the mass flow rate determination circuit 65 of the controller 32 is configured to receive a signal from load cell 45 that is indicative of the magnitude of a force (e.g., a force FN acting normal to an upper portion of the conveyor belt 40. The mass flow rate determination circuit 65 is further configured to receive a signal from the angle sensor 41 indicative of an angle of the conveyor system 22 relative to the surface 13 or the frame 11 of the cold planer 10. The mass flow rate determination circuit 65 calculates a force acting on the conveyor belt 40 based on the angle of the conveyor system 22 relative to the surface 13 or the frame 11 of the cold planer 10. The force acting on the conveyor belt 40 is indicative of an amount of force applied to conveyor belt 40 by the milled material. In one example, the mass flow rate determination circuit 65 can determine the force acting on the conveyor belt 40 by dividing the force acting on the load cell 45 by the cosine of the angle of inclination of the conveyor system 22. The force acting on the conveyor belt 40 can be divided by the gravitational acceleration to determine a mass of the milled material on the conveyor belt 40 at a particular moment in time. Finally, the mass flow rate determination circuit 65 of the controller 32 is configured to receive a signal indicative of a speed of the conveyor belt 40 or a speed of the motor 38. The mass flow rate determination circuit 65 is configured to determine a mass flow rate of milled material conveyed by the conveyor system 22 by dividing the calculated mass of the milled material on the conveyor belt 40 by the speed of the conveyor belt 40.

In some examples, the mass flow rate determination circuit 65 of the controller 32 continually determines the material mass flow rate of the milled material on the conveyor belt 40. In other examples, the mass flow rate determination circuit 65 periodically determines the material mass flow rate (e.g., at regular intervals). The mass flow rate determination circuit 65 is further configured to determine the total weight of material transferred by the conveyor system 22 and into the bed 36 of the truck 34. For example, the mass flow rate determination circuit 65 can be configured to multiply the material mass flow rate over a period of time, such as a period of milling time (e.g., a time interval over which the milling assembly 16 is engaged with the surface 13) and by summing the total over a period of conveying time (e.g., a time period over which the conveyor system 22 is actively conveying milled material into the bed 36 of the truck 34). The mass flow rate determination circuit 65 is configured to provide an indication of the mass flow rate of the milled material on the conveyor belt 40 to the operator interface 31. For example, the mass flow rate determination circuit 65 is can display a numeric value of the mass flow rate on a display screen of the operator interface 31. In other examples, the mass flow rate determination circuit 65 can provide an audible indication or some other visual indication of the mass flow rate to the operator of the cold planer 10, such as illuminating an LED that indicates that the mass flow rate of milled material is determined to be within a particular range. Similarly, the mass flow rate determination circuit 65 is configured to provide an indication of the total weight of milled material deposited into the bed 36 of the truck 34 to the operator of the cold planer 10 (or an operator of the truck 34).

In one example, the mass flow rate determination circuit 65 of the controller 32 is configured determine a mass flow rate of milled material conveyed by the conveyor system 22 based on one or more of the calculation methods discussed above, namely a volume-based calculation method, a conveyor drive power-based calculation method, or a force and belt speed-based calculation method. The mass flow rate determination circuit 65 is configured to selectively calculate the mass flow rate of milled material conveyed on the conveyor system 22 using a first calculation method under one set of circumstances and to selectively calculate the mass flow rate using a second calculation method under a second set of circumstances. For example, the mass flow rate determination circuit 65 can receive an indication that some parameter is unreliable such that mass flow rate calculations considering that parameter will likewise be unreliable. In such instances, the mass flow rate determination circuit 65 is configured to use another mass flow rate calculation method in order to achieve a more reliable mass flow rate calculation. For example, the mass flow rate determination circuit 65 can use a volume-based mass flow rate calculation method based on a determination that the conveyor belt 40 is slipping. The mass flow rate determination circuit 65 can further adjust or modify a mass flow rate calculation based on a signal or indication that some parameter is unreliable, within a certain range, or otherwise in some state. For example, the mass flow rate determination circuit 65 can determine that the conveyor belt 40 is slipping and can account for an amount (e.g., a percentage) of belt slippage in the mass flow rate calculation to bolster accuracy of the mass flow rate calculation.

The controller 32 includes a belt slip determination circuit 66. The belt slip determination circuit 66 is configured to determine an actual conveyance speed of the conveyor belt 40 that accounts for any slippage of the conveyor belt 40. As noted above, the conveyor belt 40 can "slip" relative to the motor 38 if the friction force between the motor 38 and the conveyor belt 40 is overcome, such as by the torque of the motor 38 for example. In instances where the conveyor belt 40 slips, the motor 38 will be operating to drive the conveyor belt 40 at a desired conveyance speed, but the conveyor belt 40 will be moving at the actual conveyance speed that is less than the desired conveyance speed. The conveyor belt 40 can slip relative to the motor 38, for example, as an underside of the conveyor belt 40 becomes worn, as a temperature of the conveyor belt 40 varies, as a speed of the motor 38 increases (e.g., as the torsional force momentarily exceeds the friction force), as tension in the conveyor belt 40 decreases, or for other reasons.

The belt slip determination circuit 66 is configured to receive a signal from the motor 38 indicative of an operating speed of the motor 38. The operating speed of the motor 38 can be a measure of the revolutions per minute (RPM) of the motor 38, a desired conveyance speed based on the RPM of the motor 38 and a diameter of a roller driven by the motor 38, or some other value. For example, the belt slip determination circuit 66 can determine a speed of the motor 38 based on the speed of rotation of a head pulley shaft or a speed ring gear of the motor 38. The belt slip determination circuit 66 is further configured to receive a signal from the speed sensor 46 indicative of the true speed of the conveyor belt 40. The speed sensor 46, whether embodied as a rotary encoder, an optical encoder, a magnetic encoder, or some other encoder, can measure a true speed of the conveyor belt 40 as it passes over a roller 42. For example, as depicted in FIGS. 4 and 5, among others, the speed sensor 46 includes the wheel 47 that rides on—and rotates with—the roller 42 to measure the speed of the roller 42. The belt slip determination circuit 66 compares the true speed of the conveyor belt 40 as measured by the speed sensor 46 with the speed of the motor 38 to determine an amount of belt slippage of the conveyor belt 40. In one example, the true speed of the conveyor belt 40 as measured by the speed sensor 46 can be subtracted from the operating speed of the motor 38 and then divided by the operating speed of the motor 38 to determine an amount of belt slippage of the conveyor belt 40 expressed as a percentage. In other examples, the belt slippage of the conveyor belt 40 can be calculated by subtracting the true speed of the conveyor belt 40 from the operating speed of the motor 38. In yet other examples, the belt slippage of the conveyor belt 40 can be computed in some other way.

The mass flow rate determination circuit 65 is configured to determine the mass flow rate of the milled material based at least in part on the belt slippage of the conveyor belt 40 as determined by the belt slip determination circuit 66. For example, the belt slip determination circuit 66 is communicably coupled with the mass flow rate determination circuit 65 such that the mass flow rate determination circuit 65 can receive data, signals, or other indications from the belt slip determination circuit 66. The mass flow rate determination circuit 65 is configured to determine that the belt slippage (e.g., a belt slippage percentage) is beyond some threshold value and, based on that determination, calculate the mass flow rate of milled material using a first calculation method (e.g., a volume-based calculation method) instead of a second calculation method (e.g., a conveyor drive power-based calculation method) because the first calculation method is more accurate in instances where the conveyor belt 40 is slipping. Similarly, the mass flow rate determination circuit 65 is configured to determine that the belt slippage is within some range such that the second calculation method (e.g., the conveyor drive power-based calculation method) provides an accurate mass flow rate calculation.

Figure 9:
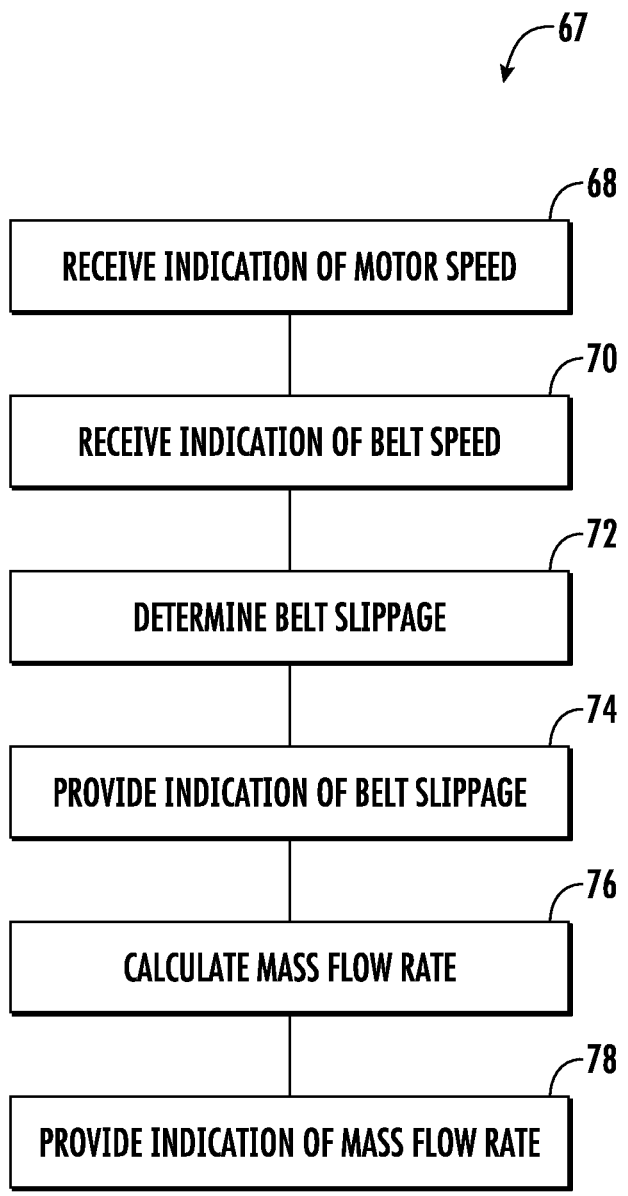
FIG. 9 is a flow diagram of a method of determining belt slippage of the conveyor belt of the conveyor system of FIG. 2, in accordance with an exemplary embodiment.

Referring now to FIG. 9, among others, a method 67 is shown. The method 67 is a method of determining an amount of belt slippage of the conveyor belt 40 and calculating a mass flow rate of milled material conveyed along the conveyor belt 40 based on the determined amount of belt slippage. Although depicted as a method six steps, it is understood that the method 67 can include fewer or more than six steps. It is also understood that the method 67 can be performed in order other than the order depicted in FIG. 9. Steps 68, 70, 72, 74, 76, and 78 can be performed by one or more controllers 32, whether physically located on the cold planer 10 or remotely located (e.g., offboard) relative to the cold planer 10.

At step 68, the method 67 includes receiving an indication of a speed of the motor 38. The speed of the motor 38 is a speed at which the motor 38 is configured to drive the conveyor belt 40 of the conveyor system 22. In some examples, the indication of the speed of the motor 38 can be a rotational speed of a component of the motor 38 (e.g., a drive wheel, a shaft, a gear, or some other component). In other examples, the indication of the speed of the motor 38 can be a hydraulic pressure of the motor 38 (e.g., where the motor 38 is a hydraulic motor) or an amperage of the motor 38 (e.g., where the motor 38 is an electric motor). The indication of the speed of the motor 38 can be provided to the controller 32 by the motor 38, by a speed sensor (e.g., an encoder) coupled with the motor 38, or by some other component or device operatively coupled with both the motor 38 and the controller 32.

At step 70, the method 67 includes receiving an indication of a speed of the conveyor belt 40. The speed of the conveyor belt 40 is a speed of the conveyor belt 40 that is driven by the motor 38 of the cold planer 10. The speed of the conveyor belt 40 is determined by the speed sensor 46. As discussed above, the speed sensor 46 can be a rotary encoder, a contactless encoder (e.g., an optical encoder, a magnetic encoder, a hall effect sensor), or some other speed sensor that is configured to determine a speed of the conveyor belt 40 or a speed of a roller 42 about which the conveyor belt 40 moves. For example, the speed sensor 46 can include the wheel 47 to ride along the roller 42 or the tight side of the conveyor belt 40 to obtain a measurement of the speed of the conveyor belt 40. The indication of the speed of the conveyor belt 40 can be provided to the controller 32 via the speed sensor 46 or by some other component or device that is operatively coupled with the speed sensor 46 and the controller 32.

At step 72, the method 67 includes determining an amount of belt slippage. The amount of belt slippage is an amount that the conveyor belt 40 is currently slipping relative to the speed of motor 38. As discussed above, the conveyor belt 40 can occasionally slip relative to the motor 38 such that the conveyor belt 40 moves at a speed that is less that the speed of the motor 38. The amount of belt slippage of the conveyor belt 40 is determined by the belt slip determination circuit 66 of the controller 32. In one example, the belt slip determination circuit 66 compares a speed of the motor 38, as represented by the received indication of the speed of the motor 38, with an actual speed of the conveyor belt 40, as represented by the received indication of the speed of the conveyor belt 40. A difference in speed between the conveyor belt 40 and the motor 38 is attributable to an amount of belt slippage.

At step 74, the method includes providing an indication of the amount of belt slippage. The controller 32 is communicably coupled with the operator interface 31 of the cold planer 10. For example, the indication of the amount of belt slippage can be a visual, audible, or other indication to the operator of the cold planer 10. The indication can indicate that the conveyor belt 40 is slipping by an amount more than some threshold amount. The indication can indicate that the conveyor belt 40 is slipping within some tolerance range. The indication can indicate that the conveyor belt 40 is not slipping or is slipping by an insubstantial amount. The controller 32 can provide periodic or continuous indications of the amount of belt slippage. For example, the belt slip determination circuit 66 can continuously determine the amount of belt slippage of the conveyor belt 40 and provide a real-time dynamic indication of a current amount of belt slippage. In some examples, the controller 32 is communicably coupled with the truck 34 or a remote monitoring device (e.g., a fleet management computing system). In such instances, the controller 32 can provide the indication of the amount of belt slippage to one or more devices other than the operator interface 31 of the cold planer 10.

At step 76, the method 67 includes determining a mass flow rate of milled material conveyed on the conveyor belt 40 of the cold planer 10. Specifically, the method 67 includes determining the mass flow rate of milled material based at least in part on the determined amount of belt slippage of the conveyor belt 40. As discussed above, depending on whether and the extent to which the conveyor belt 40 is slipping, the mass flow rate determination circuit 65 of the conveyor belt 40 is configured to calculate the mass flow rate of milled material using a particular calculation method to bolster the accuracy of the mass flow rate calculation. For example, a first mass flow rate calculation method (e.g., a force and belt speed-based calculation method) can be more accurate in circumstances where the conveyor belt 40 is not slipping or is only slipping by some amount less than a threshold amount. In such circumstances, the mass flow rate determination circuit 65 is configured to calculate the mass flow rate of the milled material according to the first mass flow rate calculation method. In other circumstances where the conveyor belt 40 is slipping beyond some threshold amount, the mass flow rate determination circuit 65 is configured to calculate the mass flow rate of milled material according to a second mass flow rate calculation method (e.g., a volume-based calculation method) that, in those circumstances, provides for a more accurate mass flow rate calculation. The mass flow rate determination circuit 65 is further configured to account for (e.g., adjust the calculation for) the determined amount of belt slippage to further bolster the accuracy of the mass flow rate calculation.

At step 78, the method 67 includes providing an indication of the determined mass flow rate of the milled material. Like step 74, the indication of the determined mass flow rate is provided to the operator interface 31 of the cold planer 10 as a visual, audible, or other indication. The indication can indicate an instantaneous, average, or target mass flow rate value, among other values. For example, the indication can indicate that the mass flow rate of milled material is within some tolerance range or outside of some tolerance range. The indication can indicate which mass flow rate calculation method is being used by the mass flow rate determination circuit 65 to calculate the mass flow rate. For example, the indication could visually depict to the operator that the mass flow rate determination circuit 65 of the controller 32 is using a belt scale calculation method to determine the mass flow rate of milled material. The mass flow rate determination circuit 65 can provide periodic or continuous indications of the mass flow rate of milled material. For example, the mass flow rate determination circuit 65 can continuously determine the mass flow rate of milled material on the conveyor belt 40 and provide a real-time dynamic indication of a current mass flow rate. In some examples, the controller 32 is communicably coupled with the truck 34 or a remote monitoring device (e.g., a fleet management computing system). In such instances, the controller 32 can provide the indication of the mass flow rate to one or more devices other than the operator interface 31 of the cold planer 10.

As described herein, the tension of the conveyor belt 40 has an effect on the mass flow rate calculation (e.g., as calculated by the mass flow rate determination circuit 65) and/or changes how the variables in the mass flow rate calculation are accounted for in the mass flow rate calculation. In general, the conveyor system 22 includes one or more tension screws that are configured to adjust the tension of the conveyor belt 40. For example, the tension screws may be manually or electronically (e.g., via an actuator) rotated, which results in increasing or decreasing (depending on the direction of rotation) the tension of the conveyor belt 40. Conventional tension screws do not include any active feedback or sensors that provide an indication of the actual tension of the conveyor belt, so initiating when to adjust the tension is a manual process that occurs at the discretion of an operator and the actual tension of the conveyor belt is not considered in conventional mass flow rate calculations.

Figure 10:
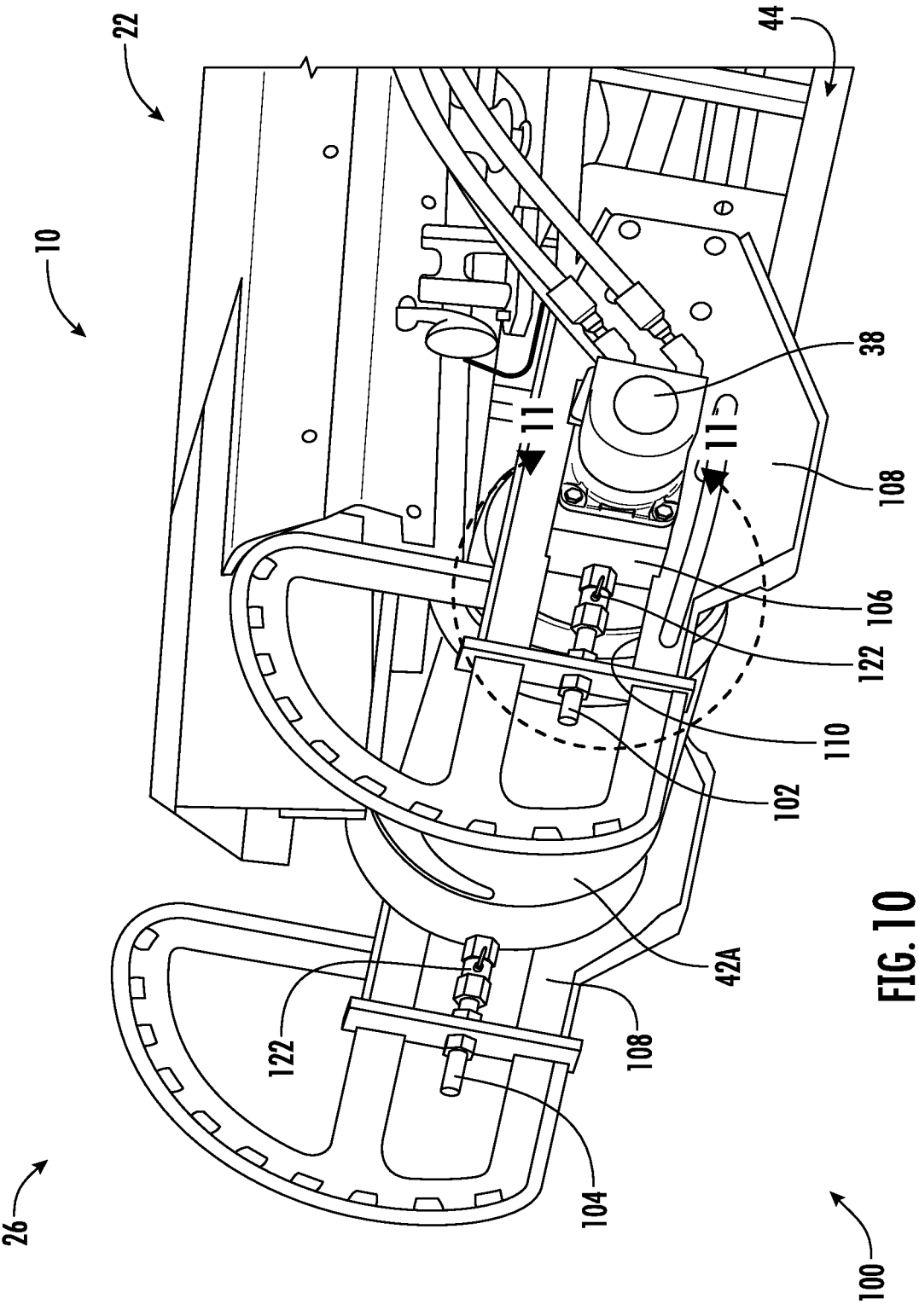
FIG. 10 is a perspective view of an end of the conveyor system of the machine of FIG. 1 including a tension sensor, in accordance with an exemplary embodiment.
Figure 11:
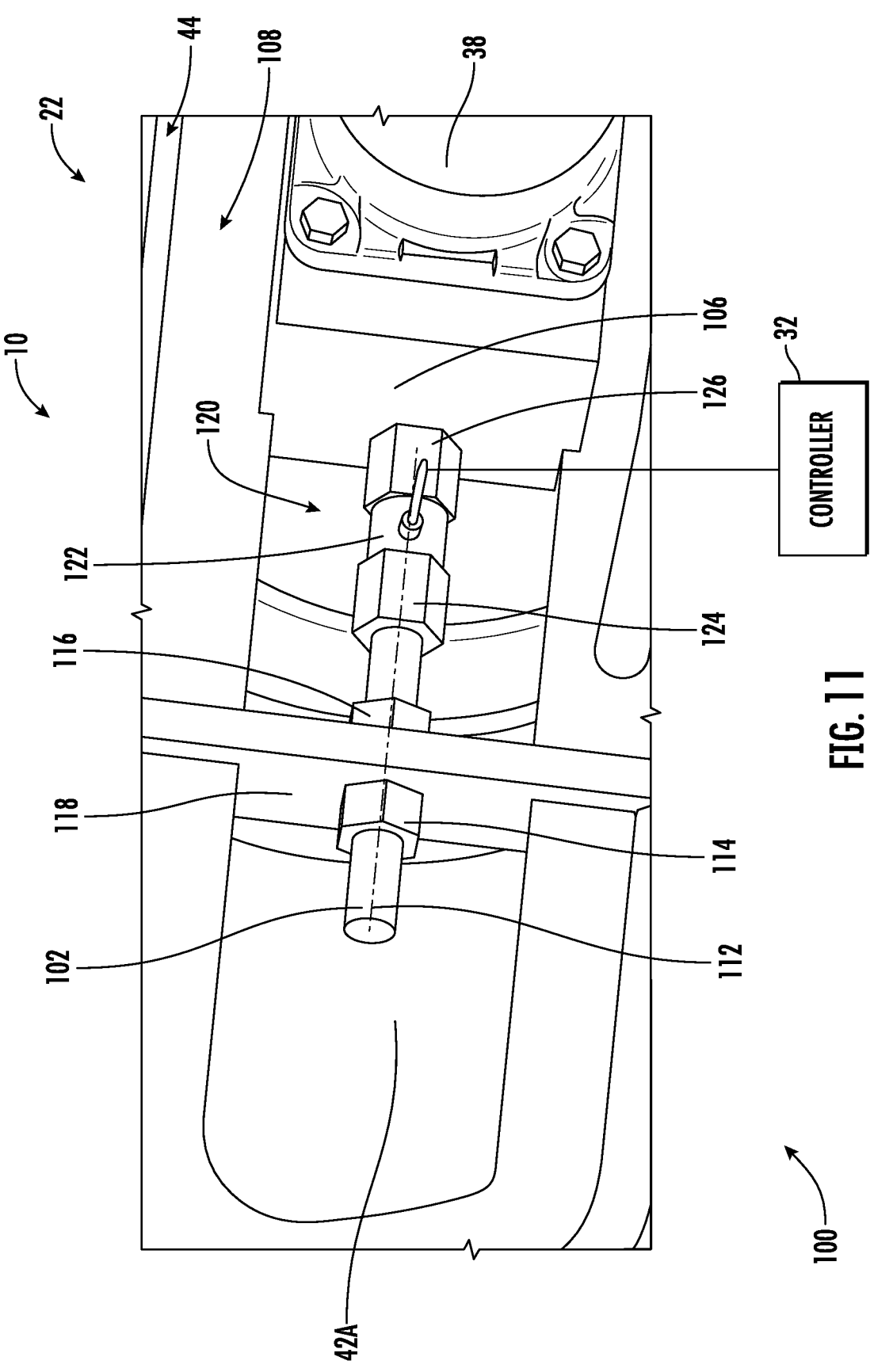
FIG. 11 is a detail view of the tension sensor of FIG. 10, in accordance with an exemplary embodiment.

Referring to FIGS. 10 and 11, among others, the cold planer 10 includes a tensioning assembly 100 according to an exemplary embodiment. The tensioning assembly 100 is arranged at the distal end 26 of the conveyor system 22. Specifically, the tensioning assembly 100 is configured to adjust a tension of the conveyor belt 40 by adjusting a position of the drive roller 42A (i.e., the roller 42 arranged closest to the distal end 26).

The tensioning assembly 100 includes a first tension screw 102 and a second tension screw 104. The first tension screw 102 and the second tension screw 104 are arranged on opposing sides of the drive roller 42A (e.g., axially-opposing sides) and are both configured to adjust a position of the drive roller 42A in response to rotation of the first tension screw 102 and the second tension screw 104. In some embodiments, the tensioning assembly 100 may include one tension screw (e.g., the first tension screw 102 or the second tension screw 104), rather than two tension screw arranged on opposing sides of the drive roller 42A. The first tension screw 102 is coupled to the drive roller 42A by a belt tensioner block 106, and the belt tensioner block 106 is coupled to the motor 38. In other words, the belt tensioner block 106 is coupled to the drive roller 42A, the motor 38, and the first tension screw 102. In some embodiments, the second tension screw 104 may be coupled to a belt tensioner block, similar to the belt tensioner block 106 but without being coupled to the motor 38 (i.e., the motor 38 is only coupled to the belt tensioner block 106 coupled to the first tension screw 102).

In general, the second tension screw 104 may include the similar components and functionality as the first tension screw 102 and, therefore, the following description of the first tension screw 102 applies to the second tension screw 104, with like elements identified using the same reference numerals. With continued reference to FIGS. 10 and 11, the first tension screw 102 is coupled between the drive roller 42A and the frame 44. The frame 44 includes a mounting plate 108 that is coupled to the frame 44 adjacent to the distal end 26. The mounting plate 108 defines a slot 110 that at least partially receives the first tension screw 102 and the belt tensioner block 106. In some embodiments, the slot 110 may act as a guide along which the belt tensioner block 106 may slide or move to adjust a position of the drive roller 42A and, thereby, the tension on the conveyor belt 40. In some embodiments, the belt tensioner block 106 may include one or more set screws or other locking mechanisms that may be selectively loosened to allow the belt tensioner block 106 to move along the slot 110 and then retightened to lock the belt tensioner block 106 in place.

With specific reference to FIG. 11, the first tension screw 102 extends axially along a central axis 112 and includes a first or outer nut 114 and a second or inner nut 116. The first nut 114 and the second nut 116 are arranged on opposing sides of a frame plate 118, which is coupled to the mounting plate 108 of the frame 44. The first tension screw 102 extends through the frame plate 118 to an adapter sleeve 120. In general, the adapter sleeve 120 is designed to integrate a tension sensor 122 into the first tension screw 102 within the same mounting space as a tension screw without a sensor. For example, a conventional tension screw without a tension sensor may be mounted within a particular axial length between the belt tensioner block 106 and the frame plate 118, and the adapter sleeve 120 enables the tension sensor 122 to be coupled to and axially aligned with the first tension screw 102 without requiring the axial length for mounting the first tension screw 102 to be modified.

The adapter sleeve 120 includes a first sleeve 124 coupled between a first side of the tension sensor 122 and the first tension screw 102 and a second sleeve 126 coupled between a second side of the tension sensor 122 and the belt tensioner block 106. In some embodiments, the first sleeve 124 and the second sleeve 126 may be rigidly coupled to the tension sensor 122 so that the first sleeve 124 and the second sleeve 126 do not rotate relative to one another. Similarly, in some embodiments, the second sleeve 126 may be rigidly coupled to the belt tensioner block 106 so that the second sleeve 126 is fixed and does not rotate relative to the belt tensioner block 106. In some embodiments, the first sleeve 124 and the second sleeve 126 may be coupled to the tension sensor 122 via an adhesive, a fastener, a weld, or an equivalent coupling that prevents the first sleeve 124 from rotating relative to the second sleeve 126. In some embodiments, the second sleeve 126 may be coupled to the belt tensioner block 106 via an adhesive, a fastener, a weld, or an equivalent coupling that prevents the second sleeve 126 from rotating relative to the belt tensioner block 106.

The tension sensor 122 is mounted axially along the first tension screw 102 and configured to measure a tension on the conveyor belt 40. For example, the tension sensor 122 is axially aligned with the center axis 112 and is rigidly coupled to the first tension screw 102 so that the tension sensor 122 measures an axial force (e.g., compressive or tension) along the first tension screw 102 that is correlated to the tension of the conveyor belt 40. In some embodiments, the tension sensor 122 is a load cell (e.g., a hydraulic load cell, a pneumatic load cell, a strain gauge load cell, a piezoresistive load cell, an inductive load cell, etc.). Regardless of the particular implementation of the tension sensor 122, the tension sensor 122 is communicably coupled to the controller 32 and provides an output signal that is indicative of the tension of the conveyor belt 40 to the controller 32.

In some embodiments, during operation, one of the nuts (e.g., the first nut 114) is loosened from the frame plate 118, which allows the screw to translate or move in a direction along the central axis 112, and the other nut (e.g., the second nut 116) is rotated to move the first tension screw 102 in a direction along the central axis 112. In some embodiments, the first tension screw 102 may include threads that engage with the first nut 114 and the second nut 116. With the first tension screw 102 being rotationally fixed to the belt tensioner block 106, rotation of the first nut 114 or the second nut 116 (one of the nuts being loosened and the other being rotated) results in translation of the first tension screw 102 along the central axis 112 (the direction of translation being determined by the direction of rotation). Moving the first tension screw 102 along the central axis 112 results in the same movement of the belt tensioner block 106 and the motor 38 and the drive roller 42A coupled thereto. When the drive roller 42A is moved in a direction along the central axis 112 (e.g., parallel to a travel direction for milled material on the conveyor belt 40), the tension on the conveyor belt 40 is adjusted in accordance with the direction and magnitude of the movement of the drive roller 42A. This change in tension is captured by the tension sensor 122 by measuring the change in axial forces along the first tension screw 102 and output to the controller 32. Once the tension on the conveyor belt 40 is adjusted, the nut that was loosened (e.g., the first nut 114) may be tightened against the frame plate 118 to axially lock the first tension screw 102.

In some embodiments, during operation, both the first nut 114 and the second nut 116 are loosened and the belt tensioner block 106 is moved to adjust the tension on the conveyor belt 40. After the belt tensioner block 106 (and the motor 38 and the drive roller 42A coupled thereto) is moved, the first nut 114 and the second nut 116 may be retightened against the frame plate 118 resulting in a new axial force on the first tension screw 102 that is measured by the tension sensor 122 and communicated to the controller 32. In some embodiments, only the output from the tension sensor 122 of the first tension screw 102 is communicated to the controller 32. In some embodiments, the output from the tension sensor 122 of the first tension screw 102 and the output from the tension sensor 122 of the second tension screw 104 are both provided to the controller 32, and the controller 32 is configured to process the two outputs (e.g., average the two values, use the highest or lowest value, add the two values, etc.) to produce a single value representing the tension of the conveyor belt 40. In some embodiments, the tension sensors 122 of the first tension screw 102 and the second tension screw 104 may be used to accurately tension the conveyor belt 40 with the output values from the tension sensors 122 being displayed on the operator interface 31 (or another display). For example, the operator interface 31 may display a predefined tension value and a tolerance for the tension of the first tension screw 102, the second tension screw 104, and a total tension value. In some embodiments, the first tension screw 102 and the second tension screw 104 may be automatically adjusted (e.g., via a motor or an actuator) so that the tension sensors 122 may be used to actively adjust the tension of the conveyor belt 40.

Figure 12:
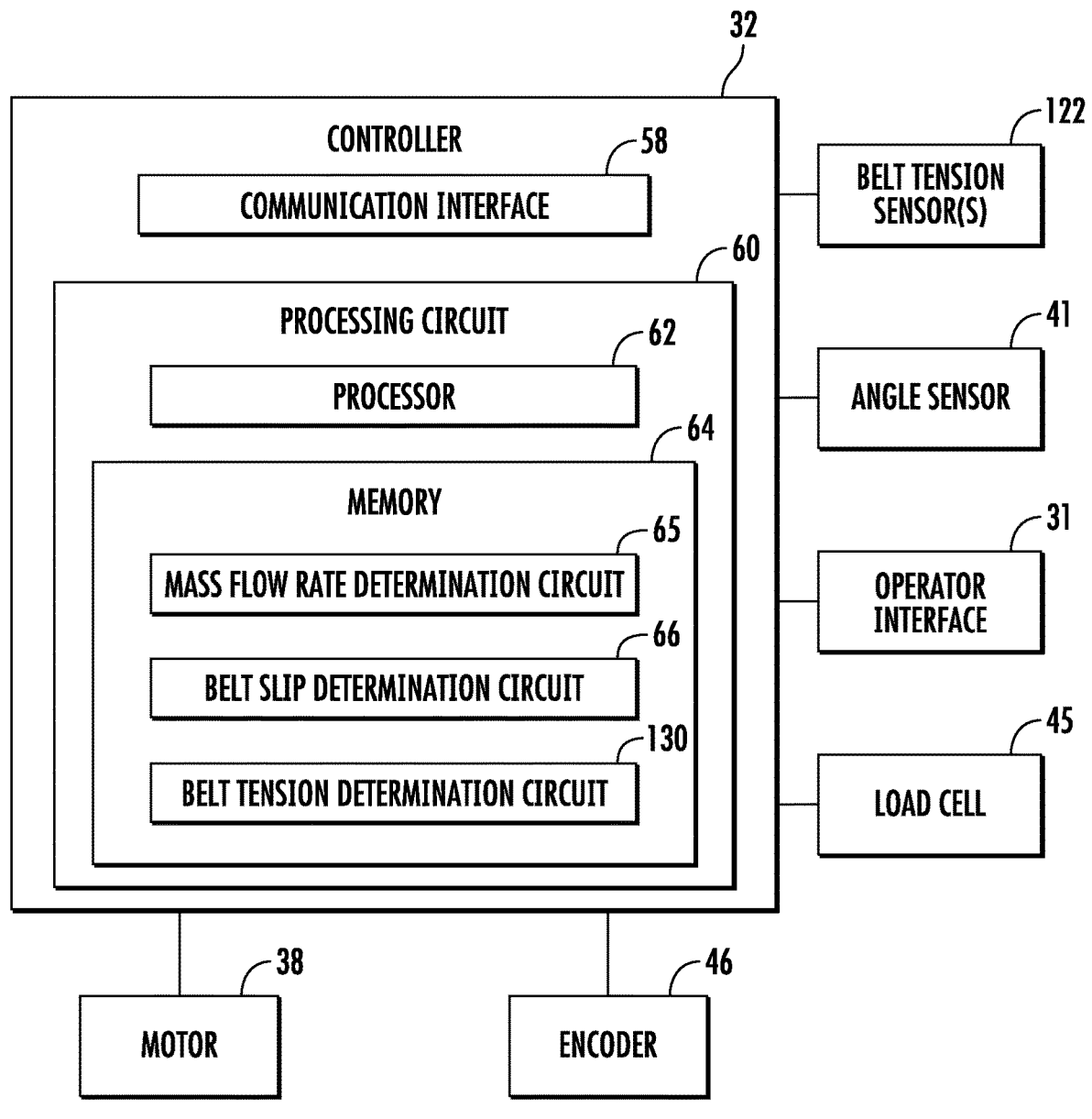
FIG. 12 is a block diagram of a controller of the machine of FIG. 1, in accordance with an exemplary embodiment.

The active measuring of the tension of the conveyor belt 40 enables the mass flow rate determination circuit 65 to more accurately calculate the mass flow rate of milled material and adjust the calculation and/or other variables accounted for in the calculation based on the tension measured by the tension sensor 122. With specific reference to FIG. 12, the controller 32 is communicably coupled to the tension sensor(s) 122 and the memory 64 includes computer code for executing one or more processes associated with determining the tension of the conveyor belt 40 via a belt tension determination circuit 130. In some embodiments, the belt tension determination circuit 130 processes or filters the output signal from the tension sensor 122 and provides a tension value of the conveyor belt 40 to the mass flow rate determination circuit 65. In some embodiments, the belt tension determination circuit 130 averages the output signals from both of the tension sensors 122 and then processes or filters the averaged output signal to provide a tension value of the conveyor belt 40 to the mass flow rate determination circuit 65.

In some embodiments, the tension value of the conveyor belt 40 calculated by the belt tension determination circuit 130 may be utilized by the controller 32 in the direct calculation of the mass flow rate of milled material calculated by the mass flow rate determination circuit 65. For example, in some operating conditions, the mass flow rate determination circuit 65 is configured to calculate the mass flow rate of milled material using the conveyor drive power-based calculation method. The conveyor drive-power based calculation method utilizes the tension of the conveyor belt 40 as a variable in the calculation. As such, the empirical value for tension of the conveyor belt 40 calculated by the belt tension determination circuit 130, which is based on a direct measurement of the tension by the tension sensor(s) 122, is provided to the mass flow rate determination circuit 65, rather than using a theoretical value for belt tension that is not based on a measured value. This further bolsters the accuracy of the mass flow rate calculation that is calculated by the mass flow rate determination circuit 65.

In some embodiments, the tension value of the conveyor belt 40 calculated by the belt tension determination circuit 130 may be utilized by the controller 32 to adjust the mass flow rate of milled material calculated by the mass flow rate determination circuit 65. For example, the mass flow rate value calculated by the mass flow rate determination circuit 65 may be adjusted based on the tension value of the conveyor belt 40. In some embodiments, the calculated mass flow rate may be adjusted according to a linear correlation, a quadratic correlation, or based on an adjustment map that applies a correction factor to the calculated mass flow rate as a function of the tension value of the conveyor belt 40, which calculated by the belt tension determination circuit and measured by the tension sensor(s) 122. Accordingly, the active measurement and calculation of the tension of the conveyor belt 40 may be used to continuously adjust the calculated mass flow rate, and a change in the tension of the conveyor belt 40 may result in an accompanying adjustment of the calculated mass flow rate, which further bolsters the accuracy of the mass flow rate calculation that is calculated by the mass flow rate determination circuit 65.

In some embodiments, the tension value of the conveyor belt 40 calculated by the belt tension determination circuit 130 may be utilized by the controller 32 to adjust one or more variables used to calculate the mass flow rate of milled material calculated by the mass flow rate determination circuit 65. For example, a correction factor may be applied to one or more variables used in the calculation of the mass flow rate by the mass flow rate determination circuit 65. The correction factor may be correlated to the tension value based on a linear correlation, a quadratic correlation, or a correction map that applies a different correction factor to the one or more variables as a function of the tension value. For example, the correction factor may apply more or less weight to one or more variables in the calculation of the mass flow rate based on the tension of the conveyor belt 40. In some embodiments, the one or more variables include a hydraulic pressure associated with the motor 38, a hydraulic temperature, an angle of the conveyor belt 40, a speed of the conveyor belt 40, or a load acting on the conveyor belt 40 (e.g., as measured by the load cell(s) 45). Applying a correction factor, based on the tension of the conveyor belt 40, to one or more of the variables in the calculation of the mass flow rate further bolsters the accuracy of the mass flow rate calculation that is calculated by the mass flow rate determination circuit 65.

In some embodiments, the tension value of the conveyor belt 40 calculated by the belt tension determination circuit 130 may be utilized to select a mass flow rate determination method from a plurality of mass flow rate calculation methods (e.g., the volume-based calculation method, the conveyor drive power-based calculation method, and/or the force and belt speed-based calculation method). For example, a particular mass flow rate calculation method may be more accurate than another mass flow rate calculation method at different values for the tension of the conveyor belt 40, and the controller 32 may be configured to select a specific mass flow rate calculation method based on the tension of the conveyor belt 40. In this way, for example, the controller 32 is configured to further bolster the accuracy of the mass flow rate calculation that is calculated by the mass flow rate determination circuit 65.

In some embodiments, the controller 32 is configured to switch between the plurality of calculation methods based on the tension of the conveyor belt 40 exceeding or dropping below a threshold tension value. Alternatively or additionally, the controller 32 may be configured to calculate the mass flow rate using each of the plurality of calculation methods (e.g., the volume-based calculation method, the conveyor drive power-based calculation method, and/or the force and belt speed-based calculation method) and apply different weighting to each of the calculated mass flow rates (e.g., take a predetermined percentage of each calculated mass flow rate), based on the tension of the conveyor belt 40, to calculate a single value for the mass flow rate of milled material.

Figure 13:
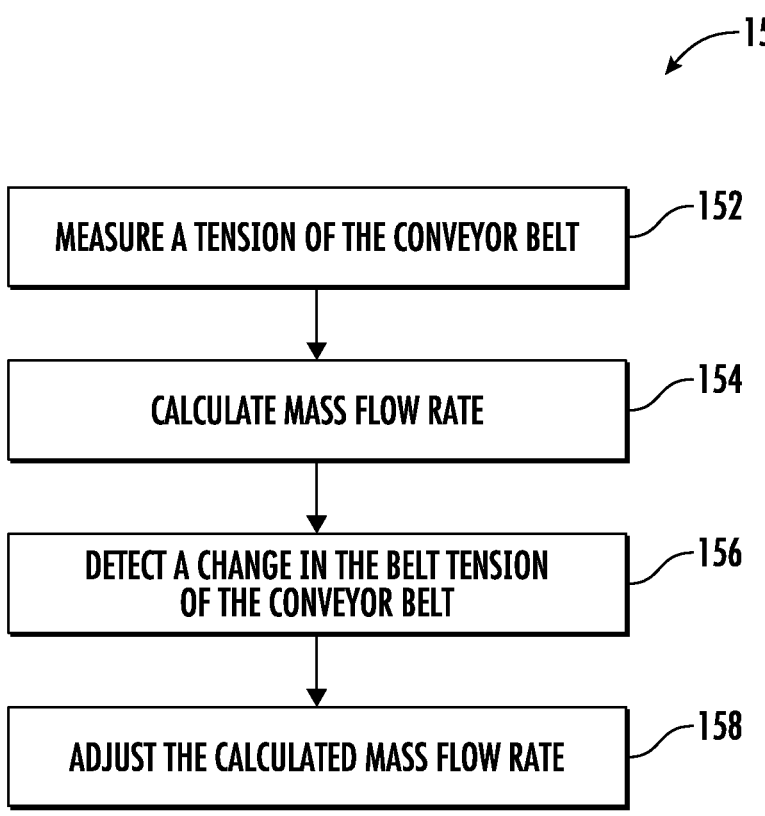
FIG. 13 is a flow diagram of a method for determining a mass flow rate of material on the conveyor system of FIG. 2, in accordance with an exemplary embodiment.

With reference to FIG. 13, a method 150 for calculating for calculating a mass flow rate of material on the cold planer 10, according to an exemplary embodiment. Although depicted as a method four steps, it is understood that the method 150 can include fewer or more than four steps. It is also understood that the method 150 can be performed in order other than the order depicted in FIG. 13. Steps 152, 154, 156, and 158 can be performed by one or more controllers 32, whether physically located on the cold planer 10 or remotely located (e.g., offboard) relative to the cold planer 10.

At step 152, the method 150 measures the tension of the conveyor belt 40 via the tension sensor(s) 122 coupled to the first tension screw 102 and/or the second tension screw 104. In some embodiments, the tension measured at step 152 is calculated into a tension value by the belt tension determination circuit 130 as described herein. Once the tension of the conveyor belt 40 is measured at step 152, the mass flow rate of milled material is calculated at step 154. The mass flow rate of milled material is calculated by the mass flow rate determination circuit 65 according to the various methods described herein. For example, the tension of the conveyor belt 40 may be used in the conveyor drive-power based calculation method to calculate the mass flow rate at step 152. Alternatively, the volume-based calculation method or the force and belt speed-based calculation method may be implemented at step 152.

Once the mass flow rate is calculated at step 154, the controller 32 may detect, at step 156, a change in the tension of the conveyor belt 40 based on the measurement from the tension sensor(s) 122. In response to the change in the tension of the conveyor belt 40, the calculated mass flow rate is adjusted at step 158. The adjustment to the calculated mass flow rate may include one or more of applying a correction factor to the calculated mass flow rate based on the change in the tension of the conveyor belt 40, applying a correction factor to a variable used in the calculated mass flow rate based on the change in the tension of the conveyor belt 40, and/or changing the mass flow rate calculation method used to calculate the mass flow rate.

INDUSTRIAL APPLICABILITY

The disclosed solutions contain several industrial applications. In general, the controller 32 of the cold planer 10 includes the belt slip determination circuit 66 to determine when and the extent to which the conveyor belt 40 of the conveyor system 22 is slipping. The controller 32 further includes the mass flow rate determination circuit 65 that is configured to calculate the mass flow rate of milled material on the conveyor belt 40 based on an indication from the belt slip determination circuit 66. The mass flow rate determination circuit 65 is configured to implement a specific mass flow rate calculation method (e.g., one of a volume-based calculation method, a conveyor drive power-based calculation method, or a force and belt speed-based method) based at least in part on information regarding slippage of the conveyor belt 40 as determined by the belt slip determination circuit 66. Specifically, the mass flow rate determination circuit 65 is configured to implement a specific mass flow rate calculation method based on an amount of belt slippage experienced by the conveyor belt 40 and as measured by the belt slip determination circuit 66. Likewise, the mass flow rate determination circuit 65 is configured to account for an amount of belt slippage experienced by the conveyor belt 40 in the mass flow rate calculation.

The disclosed solutions provide for more accurate mass flow rate calculations, which in turn provide an operator (e.g., an operator of the cold planer 10 or an operator of the truck 34) with greater confidence regarding a weight of milled material deposited in the bed 36 of the truck 34. In particular, because the controller 32 includes the mass flow rate determination circuit 65 configured to calculate mass flow rate of the milled material based at least in part on an amount of belt slippage of the conveyor belt 40, the mass flow rate determination circuit 65 can avoid using inaccurate mass flow rate calculation methods when the conveyor belt 40 is slipping an undesirable amount, for example. If the conveyor belt 40 is experiencing slippage beyond some threshold amount, the mass flow rate determination circuit 65 can calculate the mass flow rate of milled material using a first mass flow rate calculation method that is most accurate given the belt slippage experienced by the conveyor belt. If, however, the conveyor belt 40 is experiencing no belt slippage or an amount of belt slippage within some tolerance range, the mass flow rate determination circuit 65 can use a second mass flow rate calculation method that is even more accurate than the first mass flow rate calculation method in such circumstances. Moreover, the mass flow rate determination circuit 65 can account for (e.g., factor in) the belt slippage of the conveyor belt 40 as measured by the belt slip determination circuit 66 to further bolster accuracy of mass flow rate calculations.

The controller 32 is further configured to provide an indication to the operator of the cold planer 10 or some other operator (e.g., an operator of a remote monitoring service, an operator of the truck 34, or otherwise) to alert the operator of various parameters or conditions, which provides the operator with greater control of the cold planer 10 and related operations. Specifically, the controller 32 can provide an indication to the operator interface 31 of the cold planer 10 as to the mass flow rate (e.g., an instantaneous mass flow rate, an average mass flow rate, or some other value), an amount of belt slippage of the conveyor belt 40, a weight of milled material transferred to the truck 34, or some other value. Such indications can allow the operator to quickly identify issues (e.g., a worn conveyor belt 40) and rectify them in a timely manner. In addition, real-time reliable indications regarding mass flow rate and a weight of milled material transferred to the bed 36 of the truck 34 can provide for more efficiency roadway milling operations by allowing the bed 36 of the truck 34 to be filled substantially to capacity (e.g., greater than 90% capacity) without risk of inadvertently over-filling the truck and potentially incurring financial penalties as a result.

The disclosed solutions further provide for more accurate mass flow rate calculations by actively measuring and accounting for the tension of the conveyor belt 40 using the tension sensor(s) 122, which in turn provide an operator (e.g., an operator of the cold planer 10 or an operator of the truck 34) with greater confidence regarding a weight of milled material deposited in the bed 36 of the truck 34. In particular, because the controller 32 includes the belt tension determination circuit 130 that provides the mass flow rate determination circuit 65 with an indication of a tension of the conveyor belt 40 that is actively measured by the tension sensor(s) 122, the mass flow rate determination circuit 65 can more accurately calculate the mass flow rate and account for variations in the tension of the conveyor belt 40. The mass flow rate determination circuit 65 can also adjust the calculation of the mass flow rate of milled material based on the tension of the conveyor belt 40 by applying a correction factor to the calculated mass flow rate based on the change in the tension of the conveyor belt 40, applying a correction factor to a variable used in the calculated mass flow rate based on the change in the tension of the conveyor belt 40, and/or changing the mass flow rate calculation method used to calculate the mass flow rate, all of which further bolster accuracy of mass flow rate calculations.

As utilized herein with respect to numerical ranges, the terms "approximately," "about," "substantially," and similar terms generally mean +/−10% of the disclosed values, unless specified otherwise. As utilized herein with respect to structural features (e.g., to describe shape, size, orientation, direction, relative position, etc.), the terms "approximately," "about," "substantially," and similar terms are meant to cover minor variations in structure that may result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the figures. It should be noted that the orientation of various elements may differ according to other exemplary embodiments, and that such variations are intended to be encompassed by the present disclosure.

It is important to note that the construction and arrangement of the cold planer 10 and the components thereof as shown in the various exemplary embodiments is illustrative only. Additionally, any element disclosed in one embodiment may be incorporated or utilized with any other embodiment disclosed herein.

What is claimed is:

1. A cold planer, comprising:
   a conveyor system including a conveyor belt, a frame, and a roller rotatably coupled to the frame;
   a motor coupled to the conveyor belt and configured to drive the conveyor belt;
   a tension screw coupled between the roller and the frame;
   a tension sensor configured to measure the tension on the conveyor belt; and
   a controller communicably coupled with the tension sensor and the motor, the controller being configured to:
      receive the tension from the tension sensor; and
      calculate, based on the tension from the tension sensor, a mass flow rate of material on the conveyor belt.

2. The cold planer of claim 1, wherein the tension sensor comprises a load cell.

3. The cold planer of claim 1, wherein the tension sensor is coupled to the tension screw.

4. The cold planer of claim 3, wherein the tension sensor is configured to measure an axial force along the tension screw that is correlated to the tension of the conveyor belt.

5. The cold planer of claim 1, wherein the tension sensor is arranged axially between a belt tensioner block and a frame plate.

6. The cold planer of claim 5, wherein the tension sensor is coupled to an adapter sleeve, the adapter sleeve being coupled to the belt tensioner block.

7. The cold planer of claim 1, wherein the controller is further configured to select, based on the tension of the conveyor belt, a mass flow rate calculation method from a plurality of mass flow rate calculation methods, wherein the mass flow rate of material on the conveyor belt is calculated using the selected mass flow rate calculation method.

8. The cold planer of claim 7, wherein the controller is further configured to change, based on the tension exceeding or dropping below a threshold tension value, the selected mass flow rate calculation method.

9. The cold planer of claim 1, wherein the controller is further configured to adjust, based on a change in the tension of the conveyor belt, the calculated mass flow rate.

10. The cold planer of claim 1, wherein the controller is further configured to apply, based on a change in the tension of the conveyor belt, a correction factor to a variable used in the calculated mass flow rate.

11. The cold planer of claim 10, wherein the variable is a hydraulic pressure associated with the motor, a hydraulic temperature, an angle of the conveyor belt, a speed of the conveyor belt, or a load acting on the conveyor belt.

12. A cold planer, comprising:
   a conveyor system including a conveyor belt, a frame, and a roller rotatably coupled to the frame;
   a motor coupled to the conveyor belt and configured to drive the conveyor belt;
   a tension screw coupled between the roller and the frame;
   a tension load cell mounted axially along the tension screw and configured to measure the tension on the conveyor belt; and
   a controller communicably coupled with the tension load cell and the motor, the controller being configured to:
      calculate a mass flow rate of material on the conveyor belt;
      detect, from the tension load cell, a change in the tension of the conveyor belt; and
      adjust, based on the change in the tension, the calculated mass flow rate.

13. The cold planer of claim 12, wherein the tension load cell is configured to measure an axial force along the tension screw that is correlated to the tension of the conveyor belt.

14. The cold planer of claim 12, wherein the controller is further configured to select, based on the tension of the conveyor belt, a mass flow rate calculation method from a plurality of mass flow rate calculation methods, wherein the mass flow rate of material on the conveyor belt is calculated using the selected mass flow rate calculation method.

15. The cold planer of claim 14, wherein the controller is further configured to change, based on the tension exceeding or dropping below a threshold tension value, the selected mass flow rate calculation method.

16. The cold planer of claim 12, wherein the controller is further configured to apply, based on a change in the tension of the conveyor belt, a correction factor to a variable used in the calculated mass flow rate.

17. The cold planer of claim 16, wherein the variable is a hydraulic pressure associated with the motor, a hydraulic temperature, an angle of the conveyor belt, a speed of the conveyor belt, or a load acting on the conveyor belt.

18. A method for calculating a mass flow rate of material on a cold planer, the method comprising:
   measuring, via a tension sensor coupled to a tension screw, a tension of a conveyor belt;
   calculating, based on the tension measured by the tension sensor, a mass flow rate of material on the conveyor belt;
   detecting a change in the tension of the conveyor belt; and in response to detecting the change in the tension of the conveyor belt, adjusting the calculated mass flow rate of material.

19. The method of claim 18, wherein adjusting the calculated mass flow rate of material comprises:

changing a mass flow rate calculation method for the calculated mass flow rate from a first calculation method to a second calculation method.

20. The method of claim 18, wherein adjusting the calculated mass flow rate of material comprises:

applying a correction factor to a variable used in the calculated mass flow rate, wherein the variable is a hydraulic pressure associated with a motor driving the conveyor belt, a hydraulic temperature, an angle of the conveyor belt, a speed of the conveyor belt, or a load acting on the conveyor belt.

\* \* \* \* \*